US012784960B2

(12) United States Patent
Tsukamoto et al.

(10) Patent No.: US 12,784,960 B2
(45) Date of Patent: Nov. 3, 2026

(54) COIL COMPONENT AND METHOD FOR PRODUCING THEREOF

(71) Applicant: TDK CORPORATION, Tokyo (JP)

(72) Inventors: Naoto Tsukamoto, Tokyo (JP); Satoru Kurokawa, Tokyo (JP); Tomohiko Aida, Tokyo (JP); Masashi Gotoh, Tokyo (JP); Hirofumi Sasaki, Tokyo (JP); Ryuji Ando, Tokyo (JP)

(73) Assignee: TDK CORPORATION, Tokyo (JP)

( * ) Notice: Subject to any disclaimer, the term of this patent is extended or adjusted under 35 U.S.C. 154(b) by 503 days.

(21) Appl. No.: 18/523,018

(22) Filed: Nov. 29, 2023

(65) Prior Publication Data

US 2024/0177915 A1 May 30, 2024

(30) Foreign Application Priority Data

Nov. 29, 2022 (JP) ................................ 2022-190609

(51) Int. Cl.
*H01F 27/255* (2006.01)
*H01F 27/29* (2006.01)
*H01F 41/02* (2006.01)

(52) U.S. Cl.
CPC ......... *H01F 27/255* (2013.01); *H01F 27/292* (2013.01); *H01F 41/0246* (2013.01)

(58) Field of Classification Search
CPC ........ H01F 27/255; H01F 27/28; H01F 27/29; H01F 27/292; H01F 27/00; H01F 27/06; H01F 27/32; H01F 27/323; H01F 41/02; H01F 41/0206; H01F 41/0246; H01F 41/122; H01F 41/10; H01F 41/04
USPC .......... 336/83, 177, 192, 199, 208, 223, 227
See application file for complete search history.

(56) References Cited

U.S. PATENT DOCUMENTS 12,340,936 B2 * 6/2025 Urabe ....................... H01F 5/04
12,462,964 B2 * 11/2025 Matsuura ............ H01F 1/14766
12,640,305 B2 * 5/2026 Suzuki .................. H01F 27/323

FOREIGN PATENT DOCUMENTS

JP 2003-168610 A 6/2003
JP 2016-018885 A 2/2016
JP 2018-026410 A 2/2018
JP 2020-038961 A 3/2020
JP 2021-118227 A 8/2021

OTHER PUBLICATIONS

Jul. 27, 2026 Office Action issued in Japanese Application No. 2022-190609.

* cited by examiner

*Primary Examiner* — Hai L Nguyen
(74) *Attorney, Agent, or Firm* — Oliff PLC

(57) ABSTRACT

A coil component includes an exterior body, a coil positioned inside the exterior body, and terminal electrodes arranged on a surface of the exterior body and connected to lead parts of the coil. The exterior body is a columnar shape or a polyhedron shape, and includes a first plane for arranging the terminal electrodes, a second plane opposing the first plane, and one or more connecting planes connecting the first plane and the second plane; and the exterior body has a jagged edge on at least part of an edge positioned between the second plane and the one or more connecting planes.

18 Claims, 23 Drawing Sheets

COIL COMPONENT AND METHOD FOR PRODUCING THEREOF

This application claims priority to Japanese patent application No. 2022-190609 filed on Nov. 29, 2022 which is incorporated herein by reference in its entirety.

BACKGROUND

The present disclosure relates to a coil component and a method for producing thereof.

Conventionally, a coil component having a coil arranged inside of an exterior body is known. For example, Patent Document 1 discloses a coil component including an exterior body of polyhedral shape (hexahedron) and a coil positioned inside the exterior body; and the coil component functions as an inductor. Regarding the coil component of Patent Document 1, inductance characteristic can be adjusted depending on a type of an exterior material configuring the exterior body.

[Patent Document 1] Japanese Patent Application Laid-Open No. 2003-168610

SUMMARY

A coil component, including:

A coil component, comprising:

an exterior body, a coil positioned inside the exterior body, and terminal electrodes arranged on a surface of the exterior body and connected to lead parts of the coil; wherein the exterior body is a columnar shape or a polyhedron shape and includes a first plane for arranging the terminal electrodes, a second plane opposing the first plane, and one or more connecting planes connecting the first plane and the second plane; and the exterior body has a jagged edge on at least part of an edge positioned between the second plane and the one or more connecting planes.

A method for producing a coil component, including:

preparing coils;

arranging the coils in partitioned areas defined by a compartment frame to accommodate the coils in a cavity of a mold;

filling the partitioned areas with an exterior material including magnetic particles and a resin and also filling at least part of connection areas connecting the partitioned areas next to each other with the exterior material;

forming a molded article comprising exterior bodies made from the exterior material filled in partitioned areas and joining parts made from the exterior material filled in the connection areas to join the exterior bodies via the joining parts; and taking the exterior bodies out from the partitioned areas while jaggedly disconnecting the exterior bodies from the joining parts.

DETAILED DESCRIPTION

Hereinbelow, embodiments of the present disclosure will be explained using the figures. The contents of the figures are simply schematic examples for understanding the present disclosure; and appearances, dimensions, and so on may not necessarily be a precise representation of the present disclosure. Also, the present disclosure is not to be limited to the below described embodiments.

First Embodiment

Figure 1A:
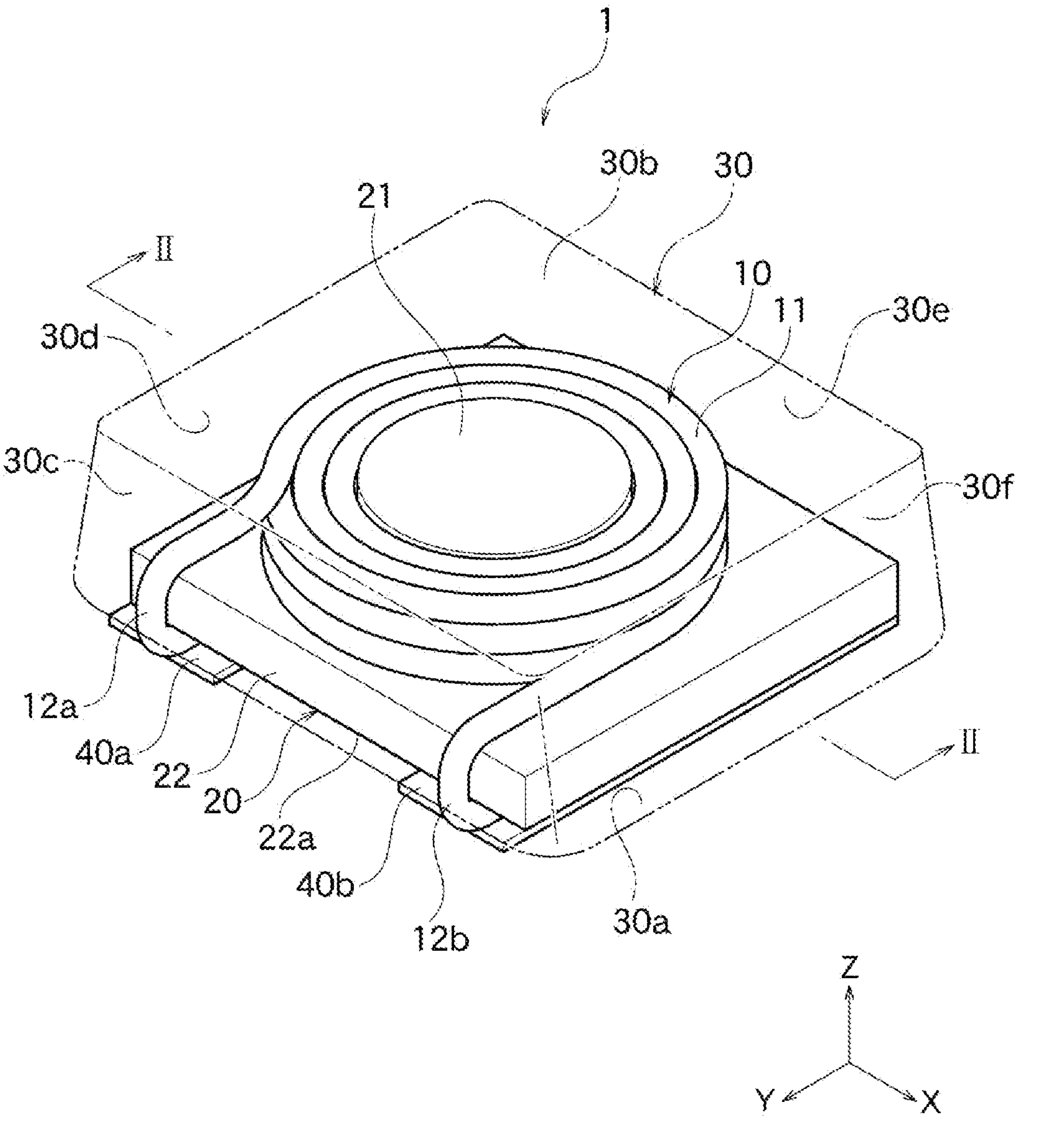
FIG. 1A is a perspective diagram showing an example of a coil component according to the first embodiment.

A coil component 1 according to the first embodiment shown in FIG. 1A functions, for example, as an inductor; and it is mounted on a power source and so on of various electronic devices. The coil component 1 includes a coil 10, an exterior body 30, and terminal electrodes 40*a* and 40*b*.

The exterior body 30 is made of an exterior material including a magnetic material (magnetic particles) and a resin, and the exterior body 30 seals the coil 10. In the present embodiment, the exterior body 30 includes a core (T-shaped core) 20 as a component. For example, the exterior material is poured into a cavity of a mold where the core 20 is provided, then this is compressed and cured for molding, thereby the exterior body 30 is obtained. In some embodiments, the step of providing the core 20 in the cavity of the mold may be omitted, and the core 20 may be omitted from the exterior body 30. Also, molding of the exterior body 30 can be carried out using various molding techniques such as resin molding, transfer molding, injection molding, dry molding, and so on.

A particle size of the magnetic particle forming the exterior body 30 is not particularly limited, and for example, it is within a range of 1 to 50 μm. The magnetic material forming the exterior body 30 is not particularly limited, and for example, it may be ferrite, a metal magnetic material, or so. The resin forming the exterior body 30 is not particularly limited, and for example, it may be an epoxy resin, a phenol resin, and so on. Relative permeability of the exterior body 30 is not particularly limited, and for example, it may be within a range of 1 to 20000.

Figure 2:
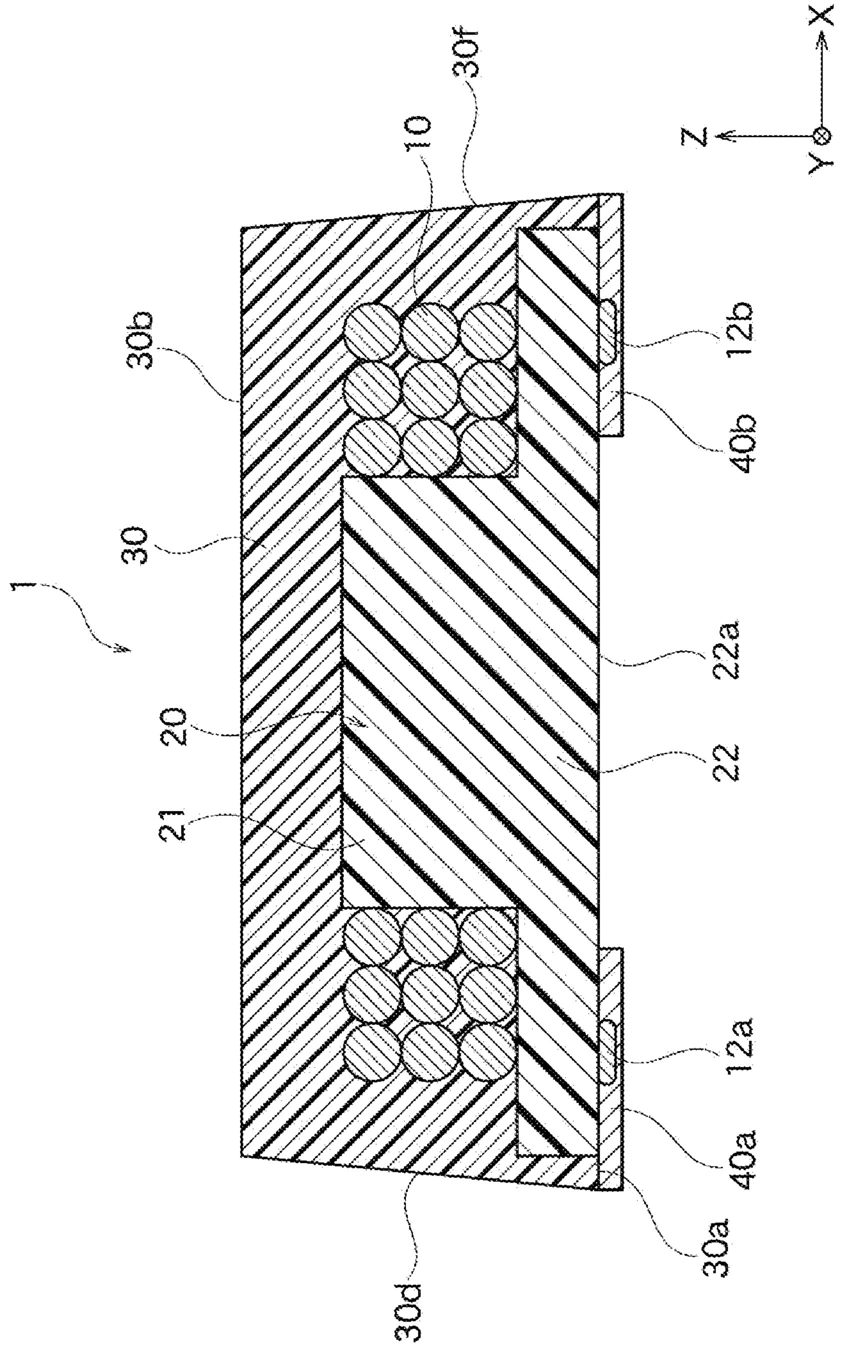
FIG. 2 is a cross-sectional diagram along a line II-II of the exterior body shown in FIG. 1A.

The exterior body 30 includes a first plane 30*a* where the terminal electrodes 40*a* and 40*b* are arranged, a second plane 30*b* opposing the first plane 30*a*, and one or more connecting planes connecting the first plane 30*a* and the second plane 30*b*. In the present embodiment, the exterior body 30 is hexahedron. Thus, as the connecting planes which connect the first plane 30*a* and the second plane 30*b*, the exterior body 30 has a third plane 30*c*, a fourth plane 30*d* adjacent to the third plane 30*c*, a fifth plane 30*e* adjacent to the fourth plane 30*d*, and a sixth plane 30*f* adjacent to the fifth plane 30*e*. As shown in FIG. 2, in the present embodiment, the exterior body 30 includes the core 20, and an end face 22*a* of the core 20 is exposed from the first plane 30*a* of the exterior body 30. Thus, part of the first plane 30*a* is configured of the end face 22*a* of the core 20.

The shape of the exterior body 30 is not limited to hexahedron, and it may also be other polyhedrons such as octahedron. Also, the shape of the exterior body 30 is not limited to polyhedron. From a point of achieving effective magnetic flux, the shape of the exterior body 30 may be a columnar shape such as a cylindrical shape. In the present disclosure, the columnar shape includes a three-dimensional shape where the first plane 30*a* and the second plane 30*b* are not congruence shapes such as a circular truncated cone shape. In the case that the exterior body 30 is a cylindrical shape or a circular truncated cone shape, the exterior body 30 has one connecting plane which connects the first plane 30*a* and the second plane 30*b*.

Figure 1B:
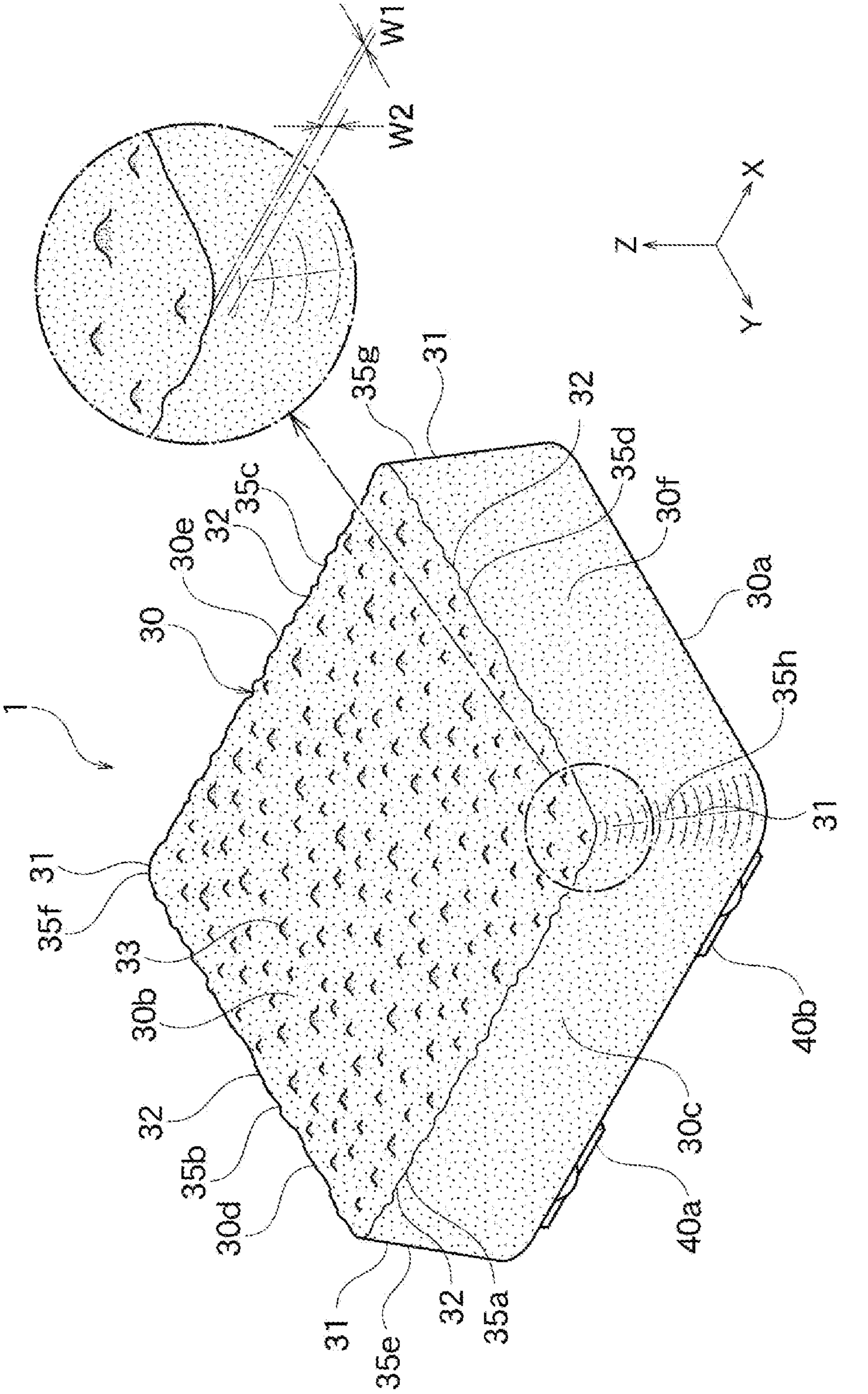
FIG. 1B is a perspective diagram of an example of a coil component schematically showing a surface shape of an exterior body.

In FIG. 1A, FIG. 1B, and FIG. 2, X-axis is an axis corresponding to a direction that the fourth plane 30*d* and the sixth plane 30*f* are opposing to each other. Y-axis is an axis corresponding to a direction that the third plane 30*c* and the fifth plane 30*e* are opposing to each other. Z-axis is an axis perpendicular to X-axis and Y-axis. Z-axis corresponds to a direction that the first plane 30*a* and the second plane 30*b* are opposing to each other. The size of the exterior body 30 is not particularly limited, and for example, a length of the exterior body 30 in X-axis direction is within a range of 0.6 to 6.5 mm, a length of the exterior body 30 in Y-axis direction is within a range of 0.6 to 6.5 mm, and a length of the exterior body 30 in Z-axis direction is within a range of 0.5 to 5.0 mm.

The third plane 30*c*, the fourth plane 30*d*, the fifth plane 30*e*, and the sixth plane 30*f* may be slanted which are forming an acute angle to the first plane 30*a*. An inclination angle θ1 of the third plane 30*c* relative to the first plane 30*a* is not particularly limited, and for example, it is within a range of $60° \leq \theta 1 < 90°$. The inclination angle θ1 may for example be within a range of $75° \leq \theta 1 \leq 85°$. Note that, the third plane 30*c* does not necessarily have to be slanted, and the inclination angle θ1 of the third plane 30*c* relative to the first plane 30*a* may be 90°. The same applies to an inclination angle θ2 of the fourth plane 30*d* relative to the first plane 30*a*, an inclination angle θ3 of the fifth plane 30*e* relative to the first plane 30*a*, and an inclination angle θ4 of the sixth plane 30*f* relative to the first plane 30*a*. The inclination angle θ1, the inclination angle θ2, the inclination angle θ3, and the inclination angle θ4 may all be the same or these may be different.

By slanting at least one of the third plane 30*c*, the fourth plane 30*d*, the fifth plane 30*e*, and the sixth plane 30*f*, the direction of the exterior body 30 can be identified from the appearance of the exterior body 30. Thus, for example, when the terminal electrodes 40*a* and 40*b* are formed on the exterior body 30, an electrode forming plane (the first plane 30*a* for the present embodiment) of the exterior body 30 can be easily identified. Also, by slanting at least one of the third plane 30*c*, the fourth plane 30*d*, the fifth plane 30*e*, and the sixth plane 30*f*, it is possible to form a compact exterior body 30.

In the present embodiment, the third plane 30*c*, the fourth plane 30*d*, the fifth plane 30*e*, and the sixth plane 30*f* are slanted. However, at least one, two, or three among these planes may be slanted. For example, the third plane 30*c* and the fifth plane 30*e* opposing to each other may be slanted, and the fourth plane 30*d* and the sixth plane 30*f* opposing to each other may not be slanted. Alternatively, the fourth plane 30*d* and the sixth plane 30*f* may be slanted, and the third plane 30*c* and the fifth plane 30*e* may not be slanted. When the slanted planes are formed on the exterior body 30 as such, in the case that the exterior body 30 is formed using a mold, the exterior body 30 can be easily taken out from the mold.

As shown in FIG. 1B, a jagged edge 32 is formed on a first edge 35*a* positioned between the second plane 30*b* and the third plane 30*c*. Also, the jagged edge 32 is formed on a second edge 35*b* positioned between the second plane 30*b* and the fourth plane 30*d*. The jagged edge 32 is formed on the third edge 35*c* positioned between the second plane 30*b* and the fifth plane 30*e*. Also, the jagged edge 32 is formed on the fourth edge 35*d* positioned between the second plane 30*b* and the sixth plane 30*f*.

Figure 8:
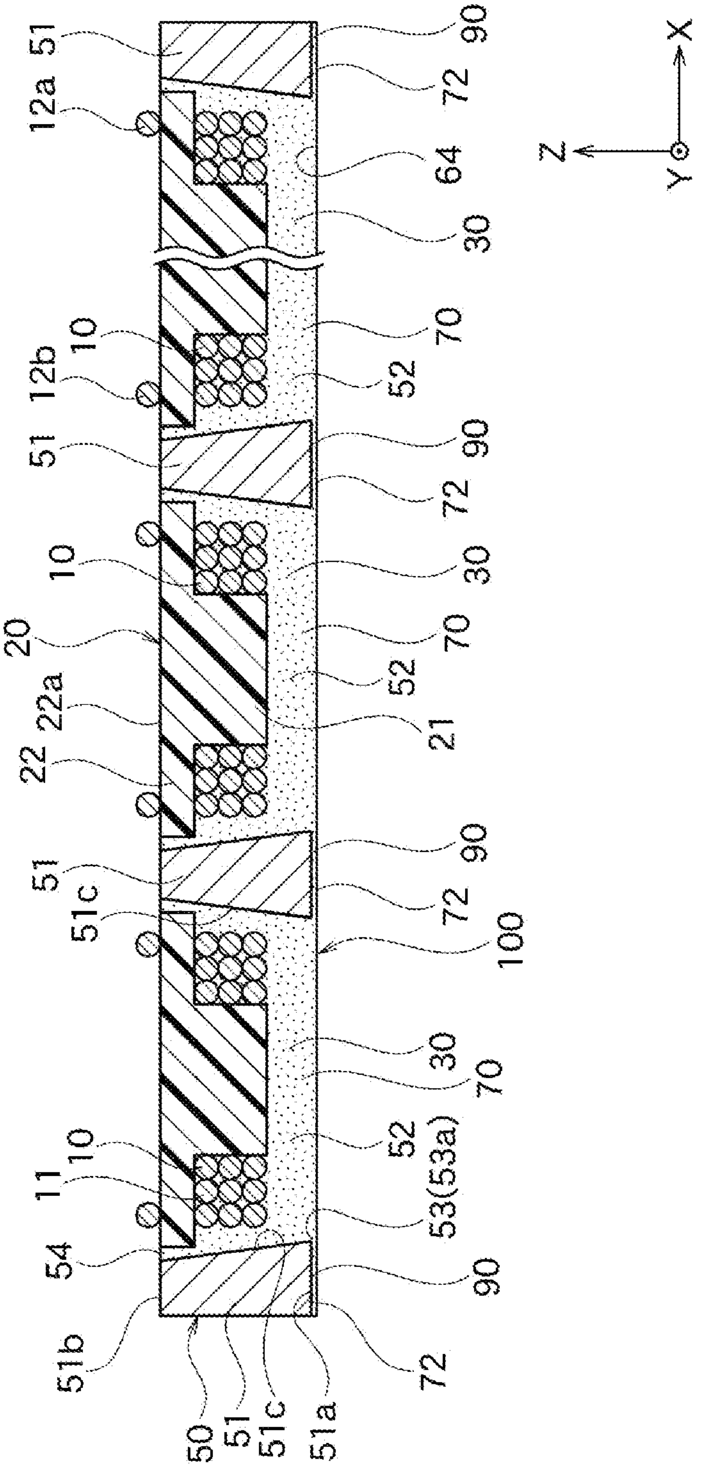
FIG. 8 is a perspective diagram showing an example of a step following the step shown in FIG. 6.

In the example shown in FIG. 1B, the jagged edge 32 is formed on each of the first edge 35*a*, the second edge 35*b*, the third edge 35*c*, and the fourth edge 35*d*; and the jagged edge 32 is formed along the periphery of the second plane 30*b*. Note that, the jagged edge 32 may be formed on any one of these edges, or to two or three. In the method of producing the coil component 1 described in below, the exterior body 30 (FIG. 8 and FIG. 9A) is jaggedly disconnected from the joining part 90 (FIG. 8 and FIG. 9B) to perform the step of taking the exterior body 30 out from the compartment frame 50 (FIG. 8). In this step, the magnetic particles are not cut and the resin is released along the magnetic particles, thus the jagged edge 32 is formed on each of the first edge 35*a*, the second edge 35*b*, the third edge 35*c*, and the fourth edge 35*d*. As such, when the exterior body 30 is jaggedly disconnected from the joining part 90, the resin is released along the magnetic particles, thus the magnetic particles are not cut; hence newly exposed surfaces are not formed. Thereby, it is possible to prevent oxidation of the magnetic particles, hence rusting of the exterior body can be suppressed even without the use of an anti-rust agent. Also, it is possible to suppress deformation of the exterior body caused by rusting, and decline of a soft magnetic property of the coil component 1 can be prevented. Hence, the inductance characteristic of the coil component 1 can be enhanced.

In the first edge 35*a*, the jagged edge 32 is formed continuously or discontinuously from one end to the other end of the first edge 35*a* in X-axis direction. Note that, the jagged edge 32 may be formed locally to part of the first edge 35*a* (for example, at a center part or an end part in X-axis direction). The same applies to the jagged edge 32 formed on the third edge part 35*c*.

In the second edge 35*b*, the jagged edge 32 is formed continuously or discontinuously from one end to the other end of the second edge 35*b* in Y-axis direction. Note that, the jagged edge 32 may be formed locally to part of the second edge 35*b* (for example, at a center part or an end part in Y-axis direction). The same applies to the jagged edge 32 formed on the fourth edge 35*d*.

In addition to the first edge 35*a*, the second edge 35*b*, the third edge 35*c*, and the fourth edge 35*d*, the jagged edge 32 may be formed on the area around these edges. For example, the jagged edge 32 may be formed on the periphery area on the second plane 30*b*. In such case, the jagged edge 32 may be formed on the position away from the first edge 35*a* by a distance W1 to the inside in Y-axis direction (see the enlarged diagram shown in FIG. 1B). The distance W1 may be, for example, within a range of 0.5 to 300 μm, or within a range of 0.5 to 40 μm. Also, the jagged edge 32 may be formed on the position away from the second edge 35*b* by the distance W1 to the inside in X-axis direction. Also, the jagged edge 32 may be formed on the position away by the distance W1 to the inside in Y-axis direction from the third edge 35*c*. Also, the jagged edge 32 may be formed on the position away from the fourth edge 35*d* by the distance W1 to the inside in X-axis direction.

Alternatively, the jagged edge 32 may be formed on an end part of the third plane 30*c*, the fourth plane 30*d*, the fifth plane 30*e*, or the sixth plane 30*f* in Z-axis direction. In this case, the jagged edge 32 may be formed on the position away from the first edge 35*a* by a distance W2 to Z-axis negative direction (see the enlarged diagram of FIG. 1B). For example, the distance W2 may be within a range of 10 to 300 μm, 20 to 200 μm, or 50 to 100 μm. The distance W2 may be the same as the below described height H3 (a thickness of the joining part 90) of a connection area 72 shown in FIG. 7A, and for example, it may be within a range of 10 to 50 μm, or 20 to 40 μm. Also, the jagged edge 32 may be formed on the position away from the second edge 35*b* by the distance W2 to Z-axis negative direction. The jagged edge 32 may be formed on the position away from the third edge 35*c* by distance W2 to Z-axis negative direction. Also, the jagged edge 32 may be formed on the position away from the fourth edge part 35*d* by distance W2 to Z-axis negative direction.

In the method of producing the coil component 1 described in below, during the step of taking the exterior body 30 (FIG. 8 and FIG. 9A) out from the compartment frame 50 (FIG. 8) while jaggedly disconnecting the exterior body 30 from the joining part 90 (FIG. 8 and FIG. 9B), the magnetic particles are not cut, and the resin is released along the magnetic particles; hence the jagged edge 32 is formed on each of the first edge 35*a*, the second edge 35*b*, the third edge 35*c*, and the fourth edge 35*d*. Thus, at least part of the jagged edge 32 has a shape which reflects the shape of the magnetic particles (that is, the shape of the jagged edge 32 follows the surface shapes of the magnetic particles), and this is different from a so-called burr. That is, the jagged edge 32 does not exist to the outer side than the hypothetical plane extending from the flat area of each of the third plane 30*c* to the sixth plane 30*f*; and the jagged edge 32 exists at the inner side (at the coil 10 side). The method of producing the coil component 1 enables to separate into an individual coil component 1 without causing outer burr.

At the fifth edge 35*e* positioned between the third plane 30*c* and the fourth plane 30*d*, a curved part 31 is formed. Also, at the sixth edge 35*f* positioned between the fourth plane 30*d* and the fifth plane 30*e*, a curved part 31 is formed to the seventh edge 35*g* positioned between the fifth plane 30*e* and the sixth plane 30*f*, a curved part 31 is formed. Also, at the eighth edge 35*h* positioned between the sixth plane 30*f* and the third plane 30*c*, a curved part 31 is formed. The curved part 31 is curved at a cross section in a direction perpendicular (Z-axis direction) to the first plane 30*a*. In the example shown in FIG. 1B, the curved part 31 is formed on each of the fifth edge 35*e*, the sixth edge 35*f*, the seventh edge 35*g*, and the eighth edge 35*h*; however, the curved part 31 may be formed on at least one, two, or three of these edge parts.

At the fifth edge part 35*e*, the curved part 31 is formed continuously or discontinuously from one end to the other end along the extending direction of the fifth edge 35*e*. The curved part 31 may be formed locally to part of the fifth edge 35*e* (for example, it may be formed on the center or to the end in the extending direction of the fifth edge 35*e*). The same applies to the sixth edge 35*f*, the seventh edge 35*g*, and the eighth edge 35*h*. By forming the curved part 31 to at least one of the fifth edge 35*e*, the sixth edge 35*f*, the seventh edge 35*g*, and the eighth edge 35*h*, magnetic flux is prevented from concentrating around these edges, hence the inductance characteristic of the coil component 1 can be enhanced.

A degree of curvature (radius of curvature) of the curved part 31 may be larger towards one side along Z-axis direction. In the example shown in FIG. 1B, the radius of curvature of the curved part 31 becomes smaller towards the second plane 30*b*; however, the radius of curvature of the curved part 31 may become smaller towards the first plane 30*a*. Note that, the radius of curvature of the curved part 31 is an index showing the degree of curvature of a peripheral plane (planar curve) of the exterior body 30 at the position of the fifth edge 35*e* (the sixth edge 35*f*, the seven edge 35*g*, or the eight edge 35*e*), at the cross section perpendicular to Z-axis of the exterior body 30 (here, the peripheral plane extends along the periphery of the exterior body 30 when viewing it along Z-axis). In regards with at least one of fifth edge 35*e*, the sixth edge 35*f*, the seventh edge 35*g*, and the eighth edge 35*h*, by increasing the radius of curvature of the curved part 31, the magnetic flux is prevented from concentrating at one side along the extending direction of these edges, and hence, the inductance characteristic of the coil component 1 can be enhanced.

At the second plane 30*b*, arbitrary pattern may be formed on the second plane 30*b* by an emboss-like pattern 33. The emboss-like pattern 33 is formed by a plurality of raised parts and/or dented parts along X-axis and/or Y-axis. These raised parts and/or the dented parts may be formed in a regular manner of a predetermined pitch. Note that, the emboss-like pattern 33 may be a group of raised parts and/or dented parts arranged in random manner. Heights of the raised parts forming the emboss-like pattern 33 may be consistent or may vary. Depths of the dented parts forming the emboss-like pattern 33 may be consistent or may vary. The heights of the raised parts or the depths of the dented parts forming the emboss-like pattern 33 is not particularly limited, and these may be within a range of 0.1 to 40 μm.

The emboss-like pattern 33 is formed on the second plane 30*b* from one end to the other end in X-axis direction. Also, the emboss-like pattern 33 is formed on the second plane 30*b* from one end to the other end in Y-axis direction. Note that, the emboss-like pattern 33 may be formed locally to part of the second plane 30*b*. A degree of roughness of the emboss-like pattern 33 (such as a surface roughness) may be smaller than the degree of roughness of the jagged edge 32, however, it may be about the same as or larger than the degree of roughness of the jagged edge 32.

By forming the emboss-like pattern 33 to the second plane 30*b*, the direction of the exterior body 30 can be identified from the appearance of the exterior body 30. Also, in the below-described method for producing the coil component, by forming the emboss-like pattern 33 in a slit-like shape to the second plane 30*b*, the exterior body 30 (FIG. 8 and FIG. 9A) can be jaggedly disconnected from the joining part 90 (FIG. 8 and FIG. 9B) and easily taken out from the compartment frame 50 (FIG. 8). In some embodiments, the emboss-like pattern 33 may be formed on the first plane 30*a*.

As shown in FIG. 1A, the core 20 has a core axis part 21 and a flange 22. The core 20 is a T-shaped core, and it is formed using a composite material including a magnetic material and a resin. For example, the core 20 may be formed using compaction molding, injection molding, machining, or so. The material constituting the core 20 may be the same as the material used for making the exterior body 30, or it may be different. Relative permeability of the core 20 may be the same as or different from the relative permeability of the exterior body 30. For example, the core 20 may be made of the material with larger relative permeability than that of the exterior body 30.

The core axis part 21 is a cylindrical shape and protrudes out from a center of the flange (brim) 22. The core axis part 21 may be protruding out from the position shifted in a radius direction from the center of the flange 22. The core axis part 21 is positioned inside the exterior body 30. The shape of the core axis part 21 is not limited to the shape shown in FIG. 1A, and for example, it may a quadrangular prism shape, an octagonal prism shape, or any other polygonal prism shapes.

The flange 22 is a flat rectangular parallelepiped shape (flat plate shape), and it is formed on one end in an axis direction of the core axis part 21. The flange 22 may be arranged parallel to the second plane 30*b* of the exterior body 30. As shown in FIG. 2, a part of the flange 22 may be exposed from the first plane 30*a*. The shape of the flange 22 is not limited to the shape shown in FIG. 1A, and for example, a planar view shape of the flange 22 may be a circular shape, an octagonal shape, or any other polygonal shape. In some embodiments, either one of the core axis part 21 or the flange 22 may be omitted form the core 20.

Thermal expansion coefficient of the core 20 (at least one of the flange 22 and the core axis part 21) may be the same as the thermal expansion coefficient of the exterior body 30, or may be different from the thermal expansion coefficient of the exterior body 30. The thermal expansion coefficient of the core 20 (at least one of the flange 22 and the core axis part 21) may be smaller than the thermal expansion coefficient of the exterior body 30, or may be larger than the thermal expansion coefficient of the exterior body 30.

When the core axis part 21 is formed using a metal to which an annealing treatment had been performed, the heat expansion coefficient of the core axis part 21 may be within a range of 10 ppm/K or more and 20 ppm/K or less. When the core axis part 21 is formed using the composite material including the magnetic material and the resin, the heat expansion coefficient of the core axis part 21 may be within a range of 20 ppm/K or more and 60 ppm/K or less. For example, the heat expansion coefficient of the exterior body 30 may be 15 ppm/K. The difference between the heat expansion coefficient of the core axis part 21 and the heat expansion coefficient of the exterior body 30 may be 2 ppm/K or larger, or 5 ppm/K or larger. The difference between the heat expansion coefficient of the core axis part 21 and the heat expansion coefficient of the exterior body 30 may be 45 ppm/K or less, or 10 ppm/K or less. In this case, it is possible to prevent cracks from forming to the exterior body 30 surrounding the core axis part 21, where cracks due to the heat expansion coefficient of the core axis part 21.

As a method for making the heat expansion coefficient of the core axis part 21 to be smaller than the heat expansion coefficient of the exterior body 30, a method of carrying out an annealing treatment to the core axis part 21 may be mentioned. When the core axis part 21 includes the magnetic particles and the resin, by carrying out the annealing treatment to the core axis part 21, a content ratio of the resin can be decreased, and the heat expansion coefficient of the core axis part 21 can be decreased.

In some embodiments, by forming the core 20 using a material which is different from that used for the exterior body 30, the heat expansion coefficient of the core axis part 21 may be made smaller than the heat expansion coefficient of the exterior body 30. Alternatively, when the core 20 and the exterior body 30 both include the magnetic particles and the resin, the heat expansion coefficient of the core axis part 21 may be made smaller than the heat expansion coefficient of the exterior body 30 by making a blending ratio of the resin in the core 20 smaller than the blending ratio of the resin in the exterior body 30.

As shown in FIG. 1A, the coil 10 includes a wound wire part 11 which is wound in a coil form, and lead parts 12*a* and 12*b* which are pulled out from the wound wire part 11. The wound wire part 11 is positioned inside the exterior body 30, and provided around the circumference plane of the core axis part 21. The wound wire part 11 is formed, for example, by winding the wire around the core axis part 21. Note that, when the coil 10 is an air-core coil, the wound wire part 11 may be fitted inside the core axis part 21. As a wire for forming the wound wire part 11, for example, a conductive wire made of copper or so such as a flat wire, a round wire, a twisted wire, a Litz wire, a braided wire, or so; alternatively, an insulation coated wire, which is made by coating these wires with insulation coating, can be used. Specifically, known wires such as AIW (polyimide wire), UEW (polyurethane wire), USTC, and so on can be used. A size of the wire is not particularly limited, and in the case of the round wire, for example, it may be within a range of 50 μm to 2 mm. In the case of the flat wire, a thickness may be within range of 20 μm to 200 μm, and a width may be within a range of 40 μm to 400 μm. As shown in FIG. 2, the number of wires wound around in the winding axis direction of the wound wire part 11 is three layers, and the number of layers in a diameter direction is three layers. The winding axis direction of wound wire part 11 corresponds Z-axis direction.

As shown in FIG. 1A, the lead parts 12*a* and 12*b* respectively constitute one end and the other end of the wire forming the coil 10, and the lead parts 12*a* and 12*b* are spaced apart in X-axis direction. Inside the exterior body 30, the lead part 12*a* may be pulled out from one end in the Z-axis direction of the wound wire part 11 towards the third plane 30*c* of the exterior body 30. Inside the exterior body 30, the lead part 12*a* may be pulled out towards the first plane 30*a*. Similarly, in the exterior body 30, the lead part 12*b* may be pulled out from the other end in the Z-axis direction of the wound wire part 11 towards the third plane 30*c* of the exterior body 30. Also, in the exterior body 30, the lead part 12*b* may be pulled out towards the first plane 30*a*.

The terminal electrodes 40*a* and 40*b* are both formed on the first plane 30*a*, and the terminal electrodes 40*a* and 40*b* are spaced apart in the X-axis direction. The lead part 12*a* is connected to the terminal electrode 40*a*, and the lead part 12*b* is connected to the terminal electrode 40*b*. For example, the terminal electrodes 40*a* and 40*b* may be a multilayer electrode which is made of an under electrode layer and a plating layer on the under electrode layer. As for the under electrode layer, it is not particularly limited, and for example, it may be a conductive paste layer including metals such as Sn, Ag, Ni, Cu and so on or an alloy of these. As for the plating layer, it is not particularly limited, and for example, it may be metals such as Sn, Au, Ni, Pt, Ag, Pd, and so on or an alloy of these.

Figure 3A:
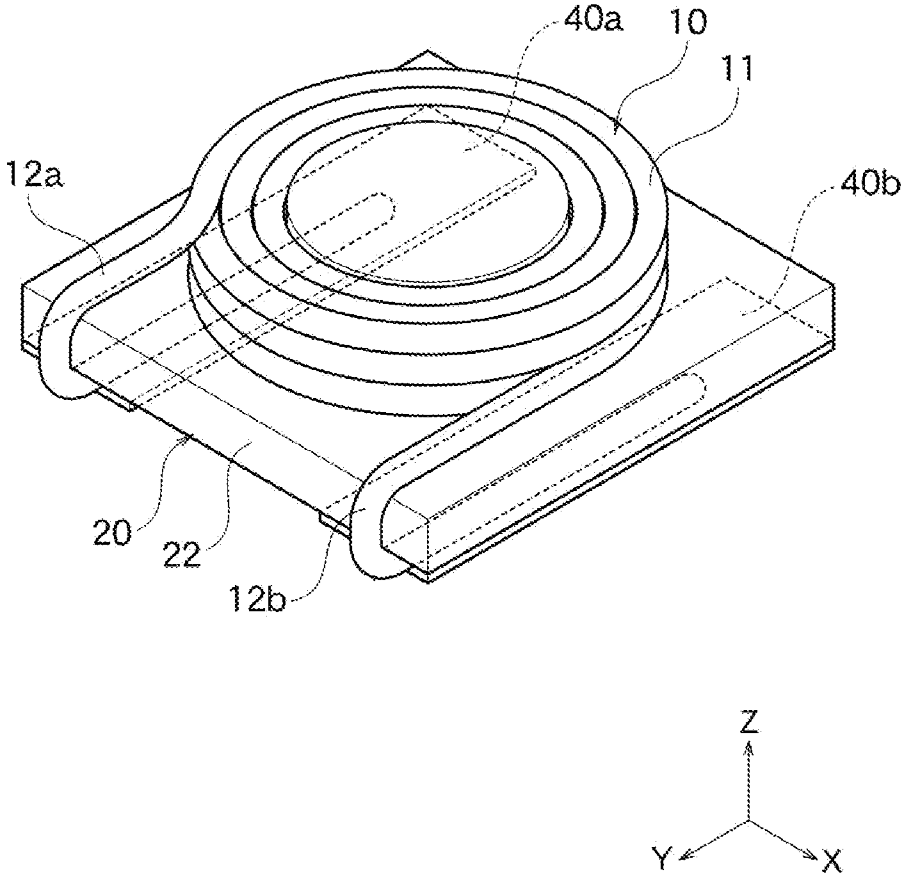
FIG. 3A is a perspective diagram of an example of a core provided with a coil and terminal electrodes.

As shown in FIG. 3A, the shapes of the terminal electrodes 40*a* and 40*b* are not particularly limited, and it may be a flat plate shape which has a rectangular shape from a planar view. Thickness of each of the terminal electrodes 40*a* and 40*b* is, for example, within a range of 3 to 100 μm. As shown in FIG. 2, in the present embodiment, the end face 22*a* of the flange 22 is exposed from the first plane 30*a*, thus at least part of the terminal electrode 40*a* and at least part of the terminal electrode 40*b* are formed on the end face 22*a* of the flange 22.

The terminal electrode 40*a* is formed on the first plane 30*a* so as to cover over the lead part 12*a* arranged on the first plane 30*a*. Similarly, the terminal electrode 40*b* is formed on the first plane 30*a* so as to cover over the lead part 12*b* arranged on the first plane 30*a*. The lead part 12*a* may be connected to the terminal electrode 40*a* using thermocompression bonding, solder connection, a conductive adhesive agent, and so on. Similarly, the lead part 12*b* may be connected to the terminal electrode 40*b* using thermocompression bonding, soldering, a conductive adhesive agent, and so on.

Part of the terminal electrode 40*a* may extend to at least one of the third plane 30*c*, the fourth plane 30*d*, and the fifth plane 30*e* of the exterior body 30 shown in FIG. 1A. Also, part of the terminal electrode 40*b* may extend to at least one of the third plane 30*c*, the fifth plane 30*e*, and the sixth plane 30*f* of the exterior body 30. In this case, when the terminal electrodes 40*a* and 40*b* are connected to the substrate using a solder or so, a fillet of the solder or so can be formed on the terminal electrodes 40*a* and 40*b*. In some embodiments, the lead parts 12*a* and 12*b* may be connected to the terminal electrodes 40*a* and 40*b* at the position corresponding to at least one of the third plane 30*c*, the fourth plane 30*d*, the fifth plane 30*e*, and the sixth plane 30*f*.

Figure 4:
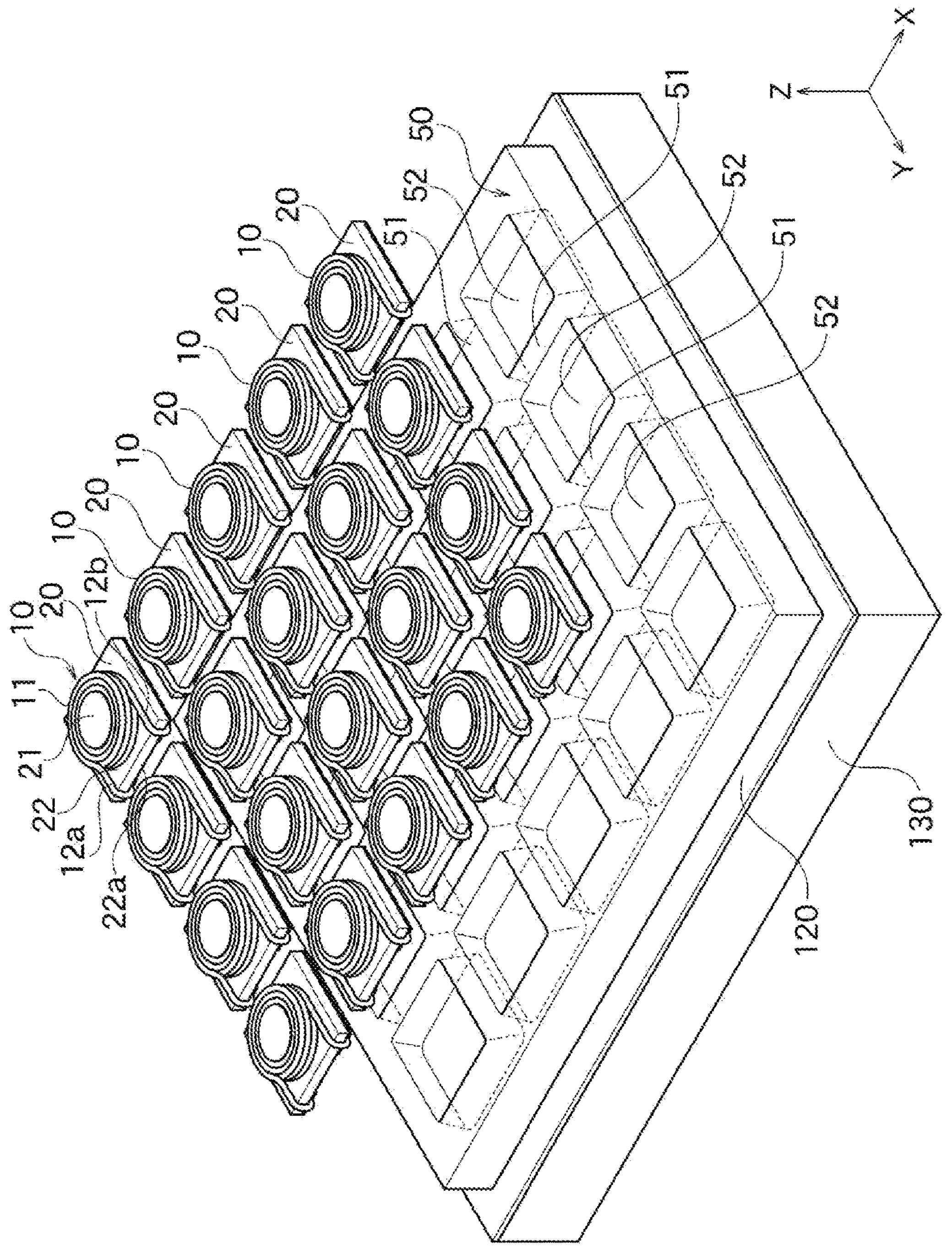
FIG. 4 is a perspective diagram of an example of a step included in a method for producing the coil component shown in FIG. 1A.

Next, the method for producing the coil component 1 is described using FIG. 4 to FIG. 10. First, the coils 10 and the cores 20 are prepared as shown in FIG. 4. In the present embodiment, mainly from the point of preventing the coils 10 from moving the positions, each of the coils 10 is fixed to the respective core 20, however, the cores 20 are not necessarily essential.

Next, the wound wire parts 11 are fit to the core axis parts 21, or, the wire is wound around each of the core axis parts 21, thereby the coils 10 are provided to the core axis parts 21. For each coil 10, the lead parts 12*a* and 12*b* of the coil 10 may be arranged on the end face 22*a* of the flange 22.

Also, the compartment frame 50 is prepared, and if necessary, the compartment frame 50 is adhered to a pedestal 130 using an adhesive sheet 120. For example, as the adhesive sheet 120, a double-sided adhesive sheet may be used as the adhesive sheet 120. In this case, by exposing the adhesive sheet 120 to heated atmosphere, the compartment frame 50 can be released from the adhesive sheet 120, thereby the compartment frame 50 is released from the pedestal 130. Note that, instead of using the adhesive sheet 120, the compartment frame 50 may be adhered to the pedestal 50 using an adhesive agent and so on. Alternatively, the compartment frame 50 may be fixed to the pedestal 130 using a mechanical means or a magnetic means.

The compartment frame 50 is, for example, made of metals; however, it may also be made of a resin and so on having a heat resistance. The compartment frame 50 has partition walls 51 and compartments 52. The compartments 52 are bottomless tubular shaped spaces surrounded by the partition walls 51. The compartments 52 may be arranged in a matrix-form along X-axis and Y-axis. The cross-sectional shape perpendicular to an axis direction (Z-axis direction) of each of the compartments 52 matches with the shape of the end face 22*a* of the flange 22; and it is a square shape, however, it may also be any other polygonal shape, or a circular shape. The compartment frame 50 has twenty compartments 52, however, the number of the compartments 52 is not particularly limited to this.

Next, the cores 20, to which the coils 10 are placed, are arranged in the compartments 52, thereby the coils 10 are arranged in the compartments 52. In the present embodiment, each of the coils 10 is arranged in each of the compartments 52. Note that, the coils 10 do not necessarily have to be placed in all of the compartments 52, and some of the compartments 52 may not have the coils 10. For each of the compartments 52, one side of the compartment 52 in the axis direction is covered by the adhesive sheet 120. On the other hand, the other side of the compartment 52 in the axis direction is opened. Therefore, when the coils 10 together with the cores 20 are arranged in the compartments 52, the end face 22*a* of the core 20 is fixed (adhered) to the adhesive sheet 120 inside each of the compartments 52.

Figure 5:
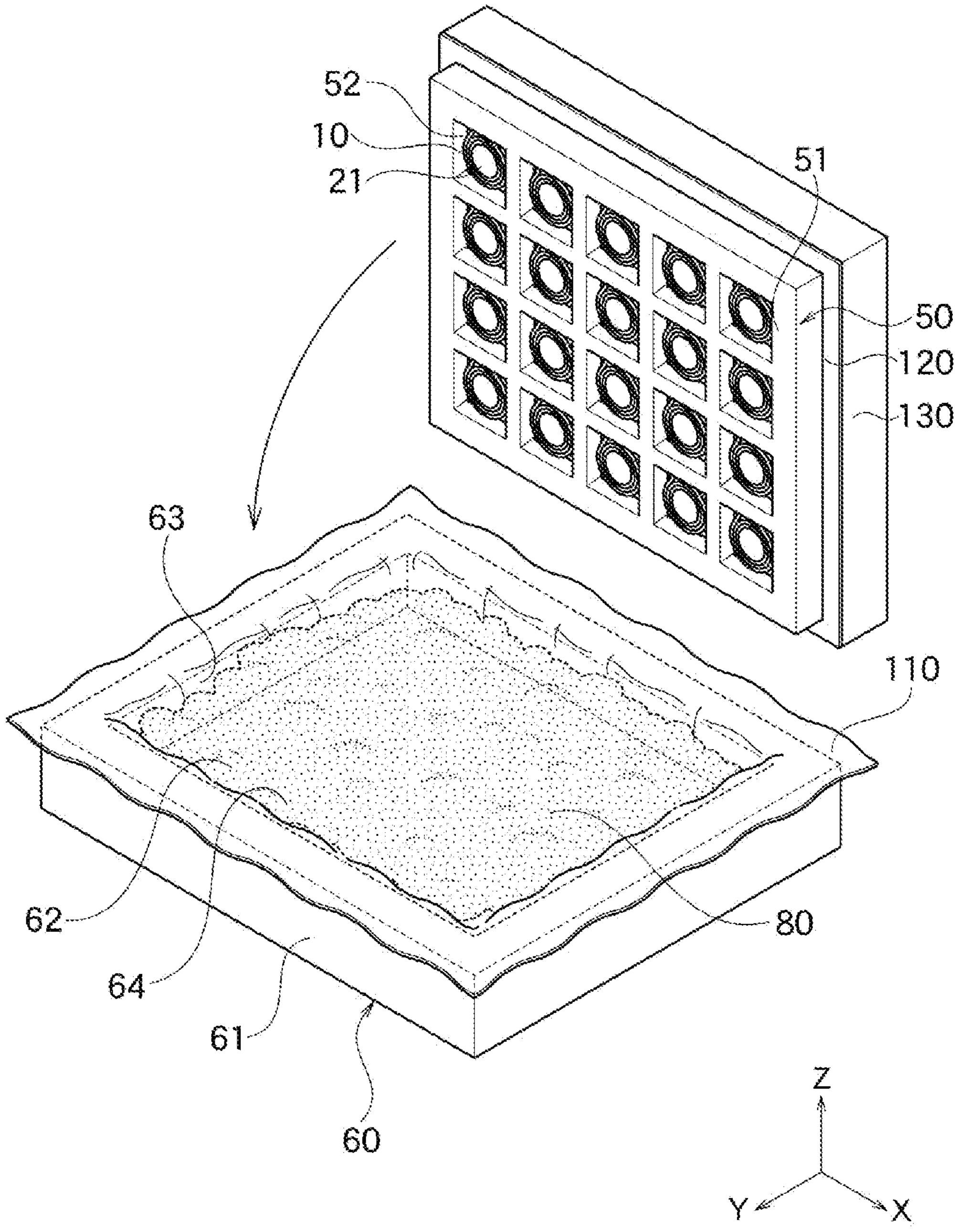
FIG. 5 is a perspective diagram showing an example of the step following the step shown in FIG. 4.

Next, as shown in FIG. 5, while the cores 20 are adhered to the adhesive sheet 120, the compartment frame 50 is placed inside a mold (lower mold) 60. Here, the mold 60 includes a main body 61, and a cavity 62 formed in the main body 61. The cavity 62 is a space (depressed area) surrounded by inner walls 63 and a bottom 64. If needed, a releasable film 110 is arranged to the bottom 64 of the cavity 62. In the example shown in FIG. 5, the releasable film 110 is arranged along the inner walls 63 and the bottom 64 of the cavity 62 such that the releasable film is in close contact with these. A peripheral edge of the releasable film 110 may be arranged outside of the edge of the cavity 62. After the releasable film 110 is arranged in the cavity 62, the cavity 62 is filled with the exterior material 80. As the exterior material 80, a material with fluidity is used. As the exterior material 80, a composite magnetic material using a thermoplastic resin, a thermo-curing resin, and so on as a binder may be used. The exterior material 80 may include a filler and so on.

Figure 6:
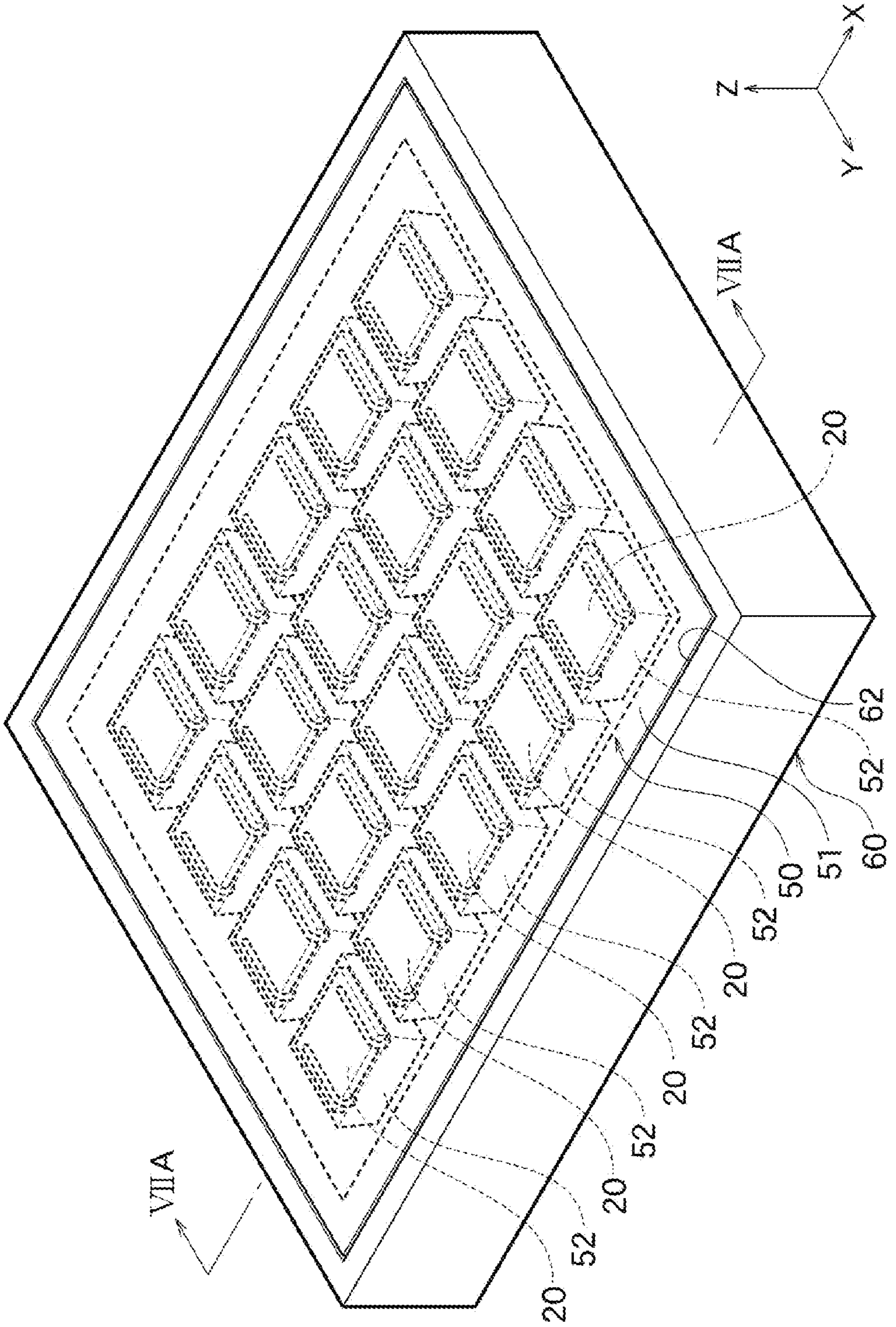
FIG. 6 is a perspective diagram showing an example of a step following the step shown in FIG. 5.

When the compartment frame 50 is placed inside the mold (into the cavity 62), the compartment frame 50 moves in a direction indicated by an arrow shown in FIG. 5. Thereby, as shown in FIG. 6, the coils 10 together with the cores 20 can be accommodated in the cavity 62. Before and/or after the compartment frame 50 is being placed in the cavity 62, the mold 60 is heated. Thereby, the connection between the adhesive sheet 120 and the compartment frame 50 is lowered, and the compartment frame 50 can be released from the pedestal 130 shown in FIG. 5.

Figure 7A:
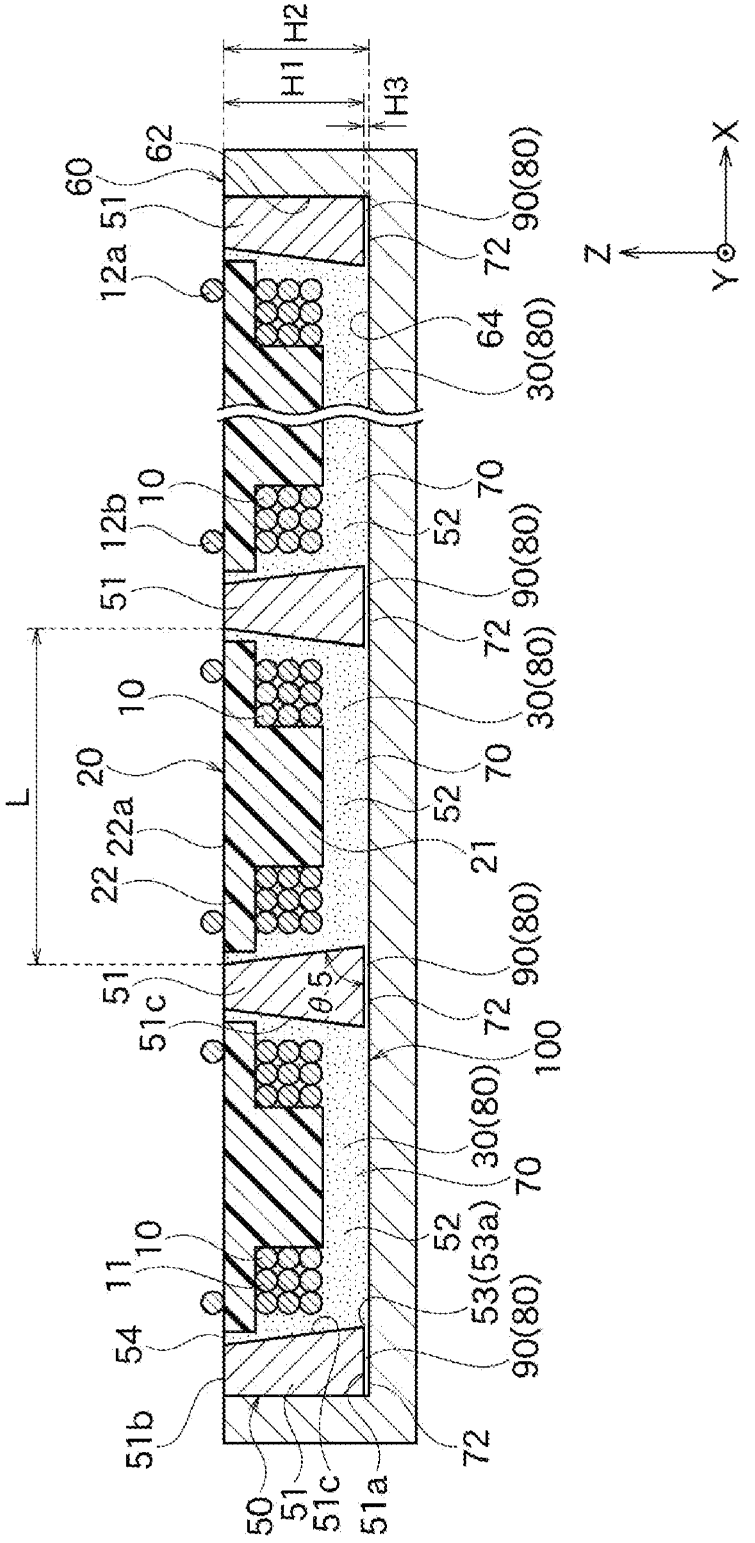
FIG. 7A is a cross-sectional diagram along a line VIIA-VIIA of a mold shown in FIG. 6.

As shown in FIG. 7A, in the cavity 62, a top of the core axis part 21 is facing the bottom 64 of the cavity 62; and there is a space between the top of the core axis part 21 and the bottom 64. Also, the end face 22*a* of the flange 22 is facing an opened plane side of the cavity 62, and the end face 22*a* is positioned at the same height as the opening plane of the cavity 62. That is, in the present embodiment, the coils 10 together with the cores 20 are arranged in the compartments 52 so that the end faces 22*a* of the flanges 22 are exposed from the compartment frame 50.

The compartment frame 50 has first openings 53 and second openings 54. The first opening 53 is formed to one side of the compartment 52, and it is opened at the side facing the bottom 64 of the cavity 62. The second openings 54 are opened at the opposite side of the first openings 54 in Z-axis direction. The second opening 54 is formed on the other side of the compartment 52, and it is opened at the side facing the opened plane of the cavity 62. The partition wall 51 has a first end 51*a* which is close to the bottom 64 of the cavity 62, and a second end 51*b* which is at the opposite side of the first end 51*a* in Z-axis direction.

When the compartment frame 50 is placed inside the cavity 62, the exterior material 80 in the cavity 62 moves into the compartments 52. Then, in each of the compartments 52, the wound wire part 11 is covered with the exterior material 80, and at least part of the lead parts 12*a* and 12*b* are covered with the exterior material 80. Also, the core axis part 21 is covered with the exterior material 80, and at least part of the flange 22 is covered with the exterior material 80. The end face 22*a* and the lead parts 12*a* and 12*b* arranged at the end face 22*a* may be exposed from the exterior material 80 (opened plane of the cavity 62).

The compartment frame 50 is placed in the mold 60 so that the position of the second end 51*b* of the partition wall 51 and the position of the opening plane of the cavity 62 are at the same position. Since the height H1 of the partition wall 51 is shorter than the depth H2 of the cavity 62, the first end 51*a* of the partition wall 51 is arranged at a position spaced apart from the bottom 64 by a distance H3. By placing the compartment frame 50 in the cavity 62, partitioned areas 70 defined by the compartment frame 50 (the partitioned walls 51) are formed in the cavity 62 at the positions corresponding to the compartments 52.

The partitioned area 70 spans to the bottom 64 of the cavity 62 from the opening plane of the cavity 62 along the Z-axis direction, and a height (depth) of the partitioned area 70 is H2. On the other hand, the compartment 52 spans to the position corresponding to the first end 51*a* of the partition wall 51 from the opening plane of the cavity 62 along the Z-axis direction, and a height (depth) of the compartment 52 is H1. Hence, the partitioned area 70 includes the compartment 52. In other words, the partitioned are 70 is defined by hypothetically extending the compartment 52 along the inner wall surface 51*c* of the partition wall 51 all the way to the position of the bottom 64.

Therefore, the above-mentioned step of arranging the coils 10 together with the cores 20 into the compartments 52 is equivalent of a step of arranging the coils 10 together with the cores 20 into the partitioned areas 70. Also, the step of filling the compartments 52 with the exterior material 80 is equivalent of a step of filling the partitioned areas 70 with the exterior material 80.

In the present embodiment, as shown in FIG. 5, while the coils 10 are arranged in the compartments 52, the compartment frame 50 is placed inside the cavity 62, thereby the coils 10 are arranged in the partitioned areas 70 shown in FIG. 7A. However, a method of arranging the coils 10 into the partitioned areas 70 is not limited thereto. For example, the compartment frame 50 may be arranged in the cavity 62 to form the partitioned areas 70, then the coils 10 may be arranged in the partitioned areas 70.

By arranging the compartment frame 50 inside the cavity 62, connection areas 72 are formed in the cavity 62 in addition to the partitioned areas 70. The connection area 72 is an area between the first end 51*a* of the partition wall 51 and the bottom 64 of the cavity 62. The connection area 72 includes a space formed between the first end 51*a* and the bottom 64, and connects the adjacent partitioned areas 70. A height H3 of the connection area 72 (height of the space) may for example be within a range of 10 $\mu m \le H3 \le 50$ $\mu m$, or may be within a range of 20 $\mu m \le H3 \le 40$ $\mu m$.

One partitioned area 70 and the other partitioned area next to each other are connected via the connection area 72. The connection area 72 extends along the bottom 64, and the connection area 70 connects one end in Z-axis direction of one partitioned area 70 and one end in Z-axis direction of the adjacent portioned area 70. Thus, the partitioned areas 70 are filled with the exterior material 80, and also the connection areas 72 connecting the partitioned areas 70 next to each other are also filled with the exterior material 80. The connection area 72 may be fully filled with the exterior material 80, or it may be filled with the exterior material while leaving some space in the connection area 72. Detailed illustration is omitted in the figure, however, the releasable film 110 shown in FIG. 5 is arranged so as to span over the plurality of partitioned areas 70 shown in FIG. 7A via the connection areas 72.

The inner wall surface 51*c* of the partition wall 51 is a slanted surface which is angled with respect to the bottom 64 of the mold 60, and it is slanted with respect to the axis direction (Z-axis direction) of the compartment 52. An inclination angle θ5 of the inner wall surface 51*c* with respect to the first end 51*a* of the partition wall 51 (it is the same as an inclination angle of the inner wall surface 51*c* with respect to the bottom 64 of the mold 60) matches an inclination angle θ1 of the third plane 30*c* with respect to the first plane 30*a* of the exterior body 30 shown in FIG. 1A. The inner wall surface 51*c* does not necessarily have to be a slanted surface, and the inclination angle θ5 of the inner wall surface 51*c* with respect to the bottom 64 of the mold 60 may be 90°. A distance L between one inner wall surface 51*c* of the partition wall 51 at one side of a direction perpendicular to the axis direction of the compartment 52 shown in FIG. 7A and another inner wall surface 51*c* of the partition wall at the other side becomes longer further away from the bottom 64 of the cavity 62 (i.e., the distance L becomes longer towards the opening plane of the cavity 62). The above-mentioned distance L corresponds to a length of the exterior body 30 in X-axis direction shown in FIG. 1A. The minimum distance of the above-mentioned distance L in X-axis direction may be shorter than the length of the end face 22*a* of the flange 22 (in case the end face 22*a* is circle, the diameter of the end face 22*a* is the distance L).

A cross-sectional area perpendicular to the axis direction of the compartment 52 becomes larger further away from the bottom 64 of the cavity 62 (i.e., the cross-sectional area becomes larger towards the opening plane of the cavity 62). The above-mentioned cross-sectional area corresponds to a cross-sectional area perpendicular to Z-axis direction of the exterior body 30 shown in FIG. 1A. Also, the opening area of each of the second openings 54 is larger than the opening area of the each of the first openings 53.

Next, the exterior material 80 placed in the cavity 62 shown in FIG. 7A is compressed and cured. More specifically, an upper mold (not shown in the figure) is prepared, and using the mold (lower mold) 60 and the upper mold, the exterior material 80 is compressed and cured at a predetermined mold temperature for a predetermined length of time. Thereby, the exterior material 80 placed in the partitioned areas 70 is compressed and cured, and the exterior bodies 30 are formed inside the partitioned areas 70. Also, the exterior material 80 in the connection areas 72 are compressed and cured, and the joining parts 90 are formed inside the connection areas 72. As described in above, the partitioned areas 70 are connected via the connection areas 72, hence the exterior bodies 30 are joined via the joining parts 90. As such, in the present embodiment, a molded article 100 is formed which includes the exterior bodies 30 formed in the partitioned areas 70, and the joining parts 90 formed on the connection areas 72 to join the exterior bodies 30.

Next, as shown in FIG. 8, the compartment frame 50, in which the molded article 100 is formed, is taken out from the mold 60 (the cavity 62). Then, the exterior bodies 30 are disconnected from the joining parts 90 so that the edges are jagged, and the exterior bodies 30 are taken out from the compartment frame 50. For example, using a jig, the joining parts 90 are pressed against the first ends 51*a* in a direction from the first ends 51*a* towards the second ends 51*b* of the partition walls 51, thereby the exterior bodies 30 and the joining parts 90 may be jaggedly disconnected. As mentioned in above, each of the opening areas of the second openings 54 is larger than each of the opening areas of the first openings 53. Therefore, the exterior bodies 30 can be easily taken out from the partitioned areas 70 via the second openings 54. In some of embodiments, the joining parts 90 may be pressed against the opening edges of the first openings 53, and the exterior bodies 30 and the joining parts 90 may be jaggedly disconnected. Alternatively, the exterior bodies 30 and the joining parts 90 may be disconnected using a cutting tool.

Figure 9A:
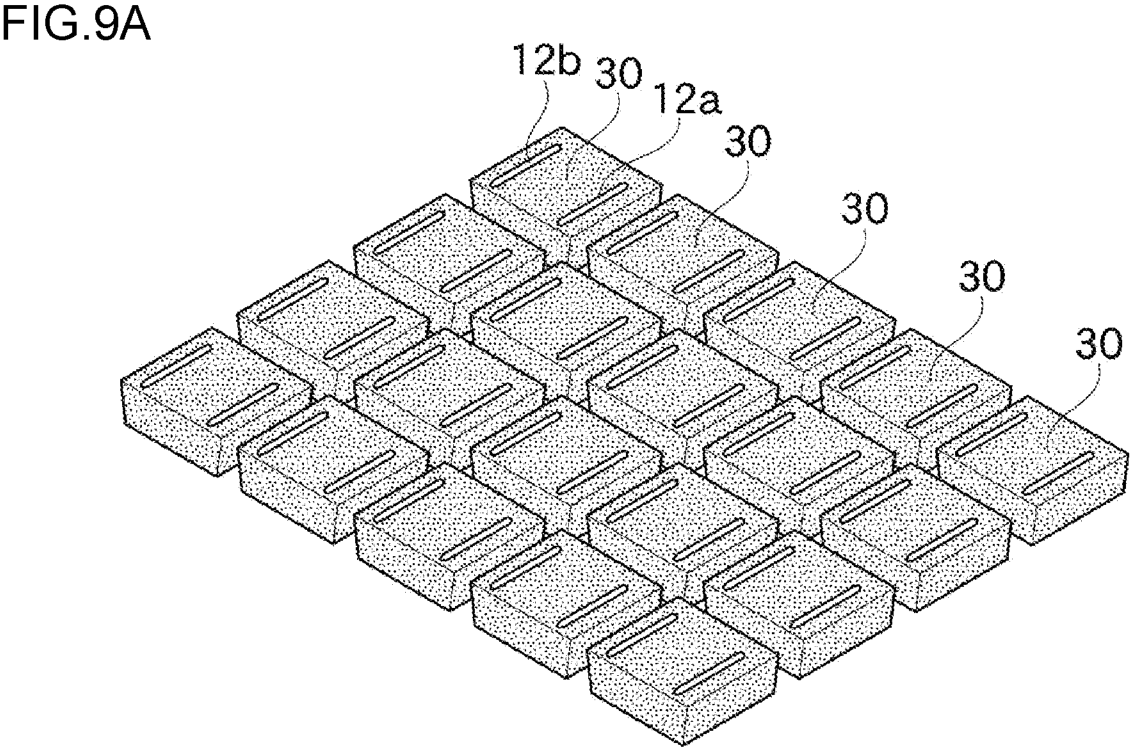
FIG. 9A is a perspective diagram showing an example of a step following the step shown in FIG. 8.

By jaggedly disconnecting the exterior bodies 30 from the joining parts 90, the exterior bodies 30 joined by the joining parts 90 are separated, and separated pieces of the exterior bodies 30 as shown in FIG. 9A can be obtained. In each of the exterior bodies 30, at a portion where the joining part 90 was connected, for example, a disconnected surface having a jagged edge is formed. This disconnected surface is a jagged edge 32 formed on each of the first edge 35*a*, the second edge 35*b*, the third edge 35*c*, and the fourth edge 35*d* of the exterior body 30 shown in FIG. 1B. This disconnected surface may extend to the second plane 30*b*, the third plane 30*c*, the fourth plane 30*d*, the fifth plane 30*e*, and the sixth plane 30*f* of the exterior body 30. A method of forming the jugged edge 32 is not limited thereto. For example, by applying physical pressure such as polishing, grinding, or so to at least one of the first edge 35*a*, the second edge 35*b*, the third edge 35*c*, and the fourth edge 35*d* of the exterior body 30, the jugged edge 32 may be formed on these edges. When the jugged edge 32 is formed by polishing or grinding the exterior body 30, a newly exposed surface is generated to the magnetic particles. On the contrary, when the exterior body 30 is jaggedly disconnected from the joining part 90, the resin is released along the magnetic particles, thus the magnetic particles are not cut which means that a newly exposed surface is not formed. Thereby, even if an anti-rust agent is not used, rusting of the surface of the exterior body 30 can be suppressed. Also, since a deformation of the exterior body 30 caused by rust can be suppressed, decline in a soft magnetic property of the coil component 1 can be prevented.

When a satin pattern is formed on the surface of the releasable film 110 (FIG. 5), the satin pattern is transferred to the second plane 30*b* of the exterior body 30 shown in FIG. 1B, and an emboss-like pattern 33 can be formed on the second plane 30*b*. A method for forming the emboss-like pattern 33 to the exterior body 30 is not limited to this. For example, by applying physical pressure such as polishing, grinding, or so to the second plane 30*b*, the emboss-like pattern 33 may be formed on the second plane 30*b*. By forming the emboss-like pattern 33 by polishing or grinding the second plane 30*b*, newly exposed surfaces are generated to the magnetic particles. On the contrary, the second plane 30*b* of the exterior body 30 to which the emboss-like pattern is formed by transferring the satin pattern of the releasable film 110, the newly exposed surfaces are not formed on the magnetic particles. Thus, even without the use of an anti-rust agent, rusting of the surface of the exterior body 30 can be suppressed. Also, since deformation of the exterior body 30 caused by rust can be suppressed, decline in a soft magnetic property of the coil component 1 can be prevented.

Figure 9B:
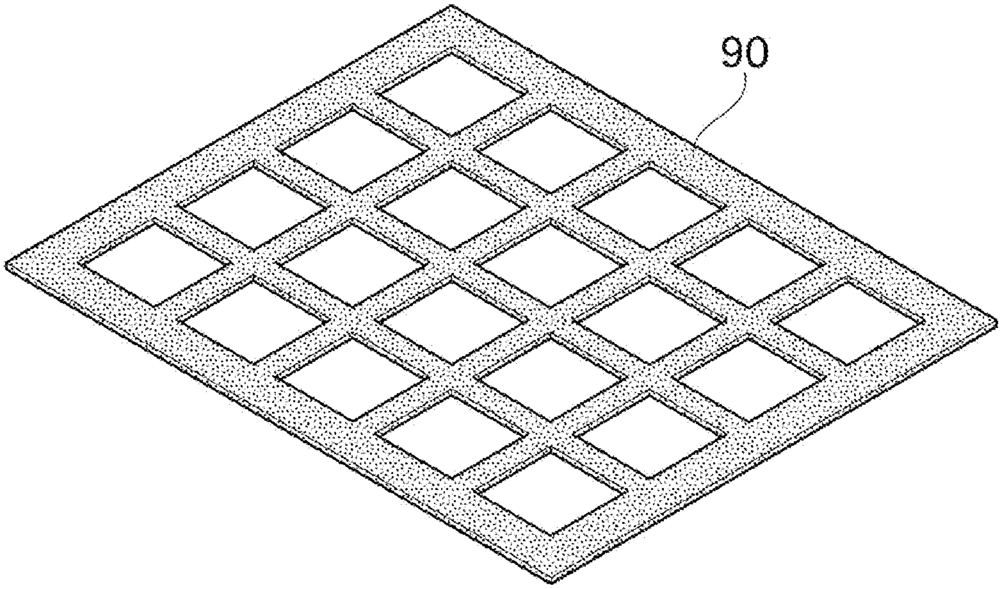
FIG. 9B is a perspective diagram showing an example of a step following the step shown in FIG. 8.

A thickness of the joining part 90 shown in FIG. 8 (this corresponds to the height H3 of the connection area 72 shown in FIG. 7A) is relatively thin, and for example, it may be within a range of 10 μm or thicker and 50 μm or thinner (or it may be within a range of 20 μm or thicker and 40 μm or thinner), hence, the exterior bodies 30 can be easily jaggedly disconnected from the joining parts 90. As shown in FIG. 9B, when the exterior bodies 30 are jaggedly disconnected from the joining parts 90, a runner of the joining parts 90 formed with a plurality of openings is formed.

Figure 10:
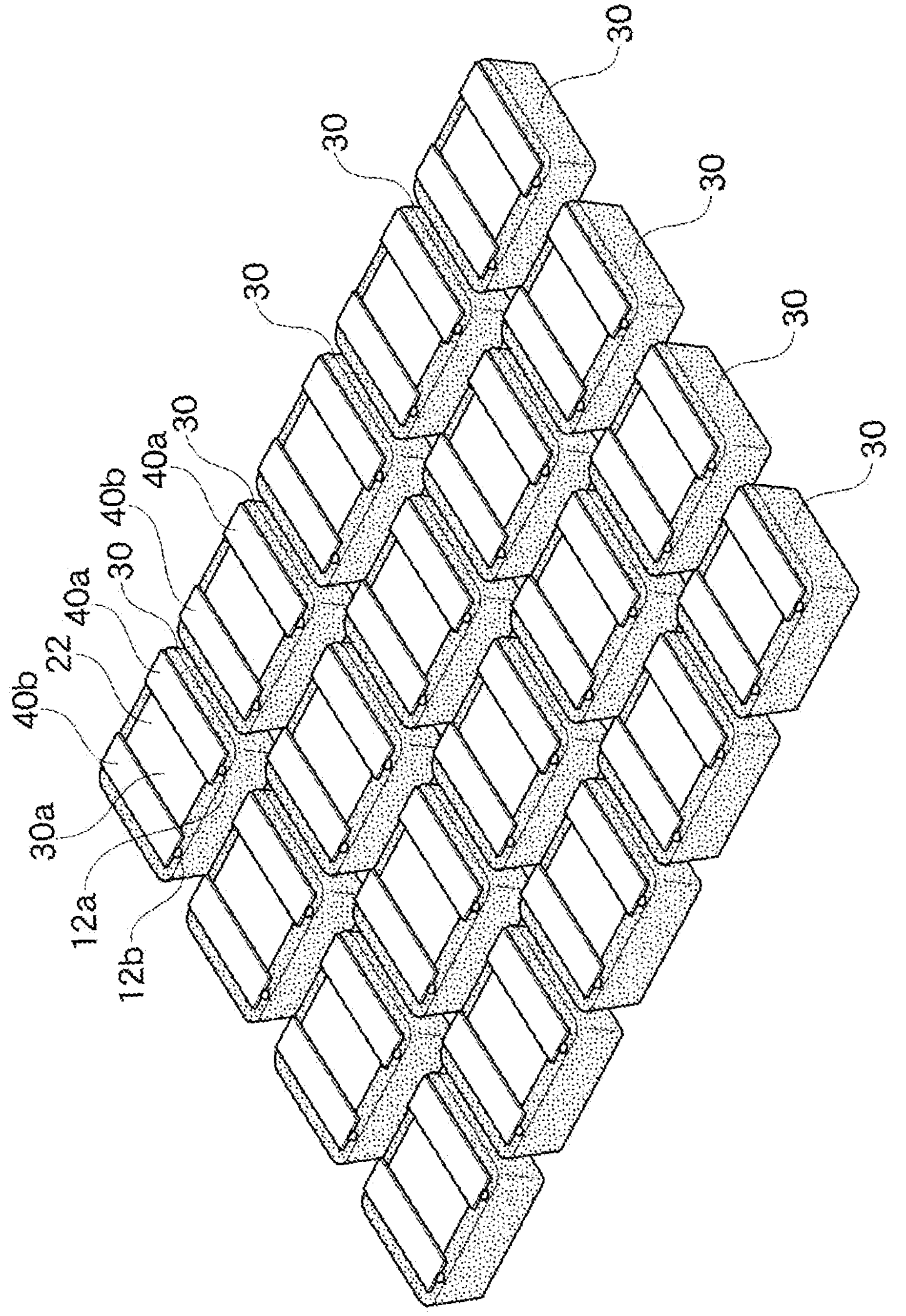
FIG. 10 is a perspective diagram showing an example of a step following the step shown in FIG. 9A.

Next, as shown in FIG. 10, terminal electrodes 40*a* and 40*b* are formed on each of the first planes 30*a* of the exterior bodies 30. A method for forming the terminal electrodes 40*a* and 40*b* is not particularly limited, and a paste method, a plating method, a spattering method, a screen-printing method, or so may be used. For example, the terminal electrodes 40*a* and 40*b* may be formed on the first plane 30*a* so as to cover the lead parts 12*a* and 12*b*. In some embodiments, the terminal electrodes 40*a* and 40*b* may be formed in advance to the end faces 22*a* of the flanges 22 of the core 20, and the lead parts 12*a* and 12*b* may be connected to the terminal electrodes 40*a* and 40*b*. The coil component 1 can be obtained as discussed in above.

As shown in FIG. 7A, FIG. 8, FIG. 9A, and FIG. 9B, in the present embodiment, the exterior bodies 30 are jaggedly disconnected from the joining parts 90 and taken out from the compartment frame 50. Therefore, it is not necessary to cut the molded article 100 using a cutting tool in order to obtain separated exterior bodies 30, hence, a step of cutting the molded article 100 can be omitted. Therefore, problems caused by cutting the molded article 100 can be avoided, for example such problems may be, the magnetic particles falling off from the molded article 100 when it is being cut and losing the exterior material 80 constituting the exterior body 30, the newly exposed surface of the magnetic particle being oxidized and causing a rust on the surface of the exterior body 30, alteration of the exterior body 30 caused by said rust, cracks forming at where the cut is made, and so on. As a result, the coil component 1 with excellent inductance property and reliability can be produced. Also, a cost of the exterior material 80 can be reduced.

Also, in the present embodiment, the disconnected surfaces with jugged edge 32 (FIG. 1B) can be formed between the exterior bodies 30 and the joining parts 90 (at the connecting parts of these) after the exterior bodies and the joining parts 90 are jaggedly disconnected. Particularly, in the present embodiment, such disconnected surface can be formed on the first edge 35*a*, the second edge 35*b*, the third edge 35*c*, and the fourth edge 35*d* of the exterior body 30 without forming the newly exposed surfaces to the magnetic particles.

Also, according to the present embodiment, it is possible to produce the plurality of exterior bodies 30 all at once. Thus, problems caused by producing the exterior bodies one by one can be avoided, for example such problems may be, inconsistency in volumes of the exterior bodies 30 which is caused by the varying amount of the exterior material 80 being introduced into the cavity 62. As result, the coil component 1 with excellent inductance characteristic and reliability can be produced. Also, the coil components 1 can be produced with high efficiency.

Also, as shown in FIG. 7A, the connection areas 72 includes a space formed between the compartment frame 50 and the bottom 64 of the cavity 62 opposing the compartment frame 50. Thus, the exterior material 80 can move between the partitioned areas 70 through this space. Thereby, it is possible to introduce substantially the same amounts of the exterior material 80 into the partitioned areas 70, hence inconsistent volumes of the exterior bodies 30 can be prevented.

Also, the compartment frame 50 includes the compartments 52 surrounded by the partition walls 51, and the first openings 53 which are formed to one side of the compartments 52 and opened at the side facing the bottom 64 of the cavity 62. The joining parts 90 are pressed against the opening edges 53*a* of the first openings 53, and the exterior bodies 30 are jaggedly disconnected from the joining parts 90. Hence, it is possible to jaggedly disconnect the exterior bodies 30 from the joining parts 90 while the molded article 100 is still in the compartment frame 50. Thus, a step of taking the molded article 100 out from the compartment frame 50 (a joined article of the exterior bodies 30 and the joining parts 90) can be omitted, hence, the process of separating the exterior bodies 30 into individual pieces can be simplified.

Also, the partition walls 51 include the first ends 51*a* which are closer to the bottom 64 of the cavity 62, and the second ends 51*b* which are at the opposite side of the first end 51*a*. The joining parts 90 are pressed against the first ends 51*a* in a direction from the first ends 51*a* towards the second ends 51*b* to jaggedly disconnect the exterior bodies 30 from the joining parts 90. Hence, the exterior bodies 30 jaggedly disconnected from the joining parts 90 are released to the outside of the compartment frame 50, thus it is easy to take out the exterior bodies 30 from the compartment frame 50.

Also, the cross-sectional areas of the compartments 52 perpendicular to the axis direction (Z-axis direction) of the compartments 52 increase further away from the bottom 64 of the cavity 62. Thus, when the joining parts 90 are pressed against the first ends 51*a* of the partition walls 51 in a direction moving away from the bottom 64 of the cavity 62 (in a direction towards the second ends 51*b* from the first ends 51*a*), the exterior bodies 30 jaggedly disconnected from the joining parts 90 can be taken out from the compartments 52 at the side of the second ends 51*b*.

Also, the distance L represents a distance between one inner wall surface 51*c* of the partition wall 51 positioned at one side of the compartment 52 and another inner wall surface 51*c* of the partition wall 51 positioned at the other side. The distance L along a direction perpendicular (X-axis direction) to an axis direction of the compartment becomes larger further away from the bottom 64 and the cavity 62. Hence, the distance between the inner wall surfaces 51*c* is longer at the side closer to the second end 51*b* side comparted to at the side closer to the first end 51*a* side. As a result, the cross-sectional area perpendicular to the axis direction of the compartment 52 becomes larger. Thus, when the joining parts 90 are pressed against the first ends 51*a* of the partition walls 51 (or against the opening edges 53*a* of the first openings 53) in a direction away from the bottom 64 of the cavity 62 (in a direction towards the second end 51*b* from the first end 51*a*), the exterior bodies 30 jaggedly disconnected from the joining parts 90 can be taken out from the compartments 52 at the second end 51*b* side.

Also, the compartment frame 50 includes second openings 54 which are opened at the opposite side of the first openings 53, and an opening area of each of the second openings 54 is the same or larger than each of the opening areas of the first openings 53. Hence, the exterior bodies 30 are taken out from the partitioned areas 70 through the second openings 54. Since the opening areas of the second openings 54 are the same or larger than the opening areas of the first openings 53, the individual pieces of the exterior bodies 30 can be taken out from the second openings 54 when the joining parts 90 are pressed against the opening edges 53*a* of the first openings 53.

Also, the method for producing the coil component 1 according to the present embodiment further includes a step of preparing cores 20 having the core axis parts 21 and the flanges 22 and a step of providing the coils 10 to the core axis parts 21 for arranging the coils 10 together with the cores 20 into the partitioned areas 70. Thereby, the coil 10 is fixed to the core 20, and the position shifting of the coil 10 in the partitioned areas 70 can be prevented.

Also, in the present embodiment, the coils 10 are arranged together with the cores 20 in the partitioned areas 70 so that the end faces 22*a* of the flanges 22 are exposed from the compartment frame 50. Therefore, it becomes difficult for the exterior material 80 in the partitioned areas 70 from attaching to the end faces 22*a* of the flanges 22. Hence, it is possible to form the terminal electrodes 40*a* and 40*b* to the end faces 22*a* of the flanges 22 without being interfered by the exterior material 80. Also, when the terminal electrodes 40*a* and 40*b* are formed in advance to the end faces 22*a* of the flanges 22, it is possible to prevent the exterior material 80 in the partitioned areas 70 from attaching to the terminal electrodes 40*a* and 40*b*.

Also, the method for producing the coil component 1 according to the present embodiment includes a step of arranging the releasable film 110 to the bottom 64 of the cavity 62. The releasable film 110 is arranged so that the releasable film 110 cover over the partitioned areas 70 via the connection areas 72. Therefore, as shown in FIG. 7A and FIG. 8, when the compartment frame 50 formed with the molded article 100 is taken out from the cavity 62, the molded article 100 is easily released from the bottom 62 of the cavity 64. Therefore, the compartment frame 50 formed with the molded article 100 can be easily taken out from the cavity 62.

Also, in the coil component 1 according to the present embodiment, a jagged edge 32 is formed on at least part of the first edge 35*a* positioned between the second plane 30*b* and the third plane 30*c*. Thus, this can suppress the exterior body 30 from becoming too angular around the first edge 35*a*. Similarly, due to the jagged edge 32 formed on at least part of the second edge 35*b*, the third edge 35*c*, and the fourth edge 35*d*, the exterior body 30 is prevented from becoming too angular around these edges as well. Also, since such jagged edges formed on at least part of these edges are derived from the magnetic particles, the inductance characteristic of the coil component 1 can be enhanced. Particularly, in the present embodiment, the magnetic particles can maintain the original shape since the magnetic particles are less likely to be exposed to stress such as cutting and so on, thus the above-mentioned edges can have the jagged edge 32 having a rough surface which follows along the surface shapes of the magnetic particles.

Second Embodiment

A coil component 1A of the second embodiment shown in FIG. 11 has the same configuration as the coil component 1 of the first embodiment except for the below described points. For the members which are the same as those used in the coil component 1 of the first embodiment, the same reference signs are given and detailed description is omitted.

Figure 11:
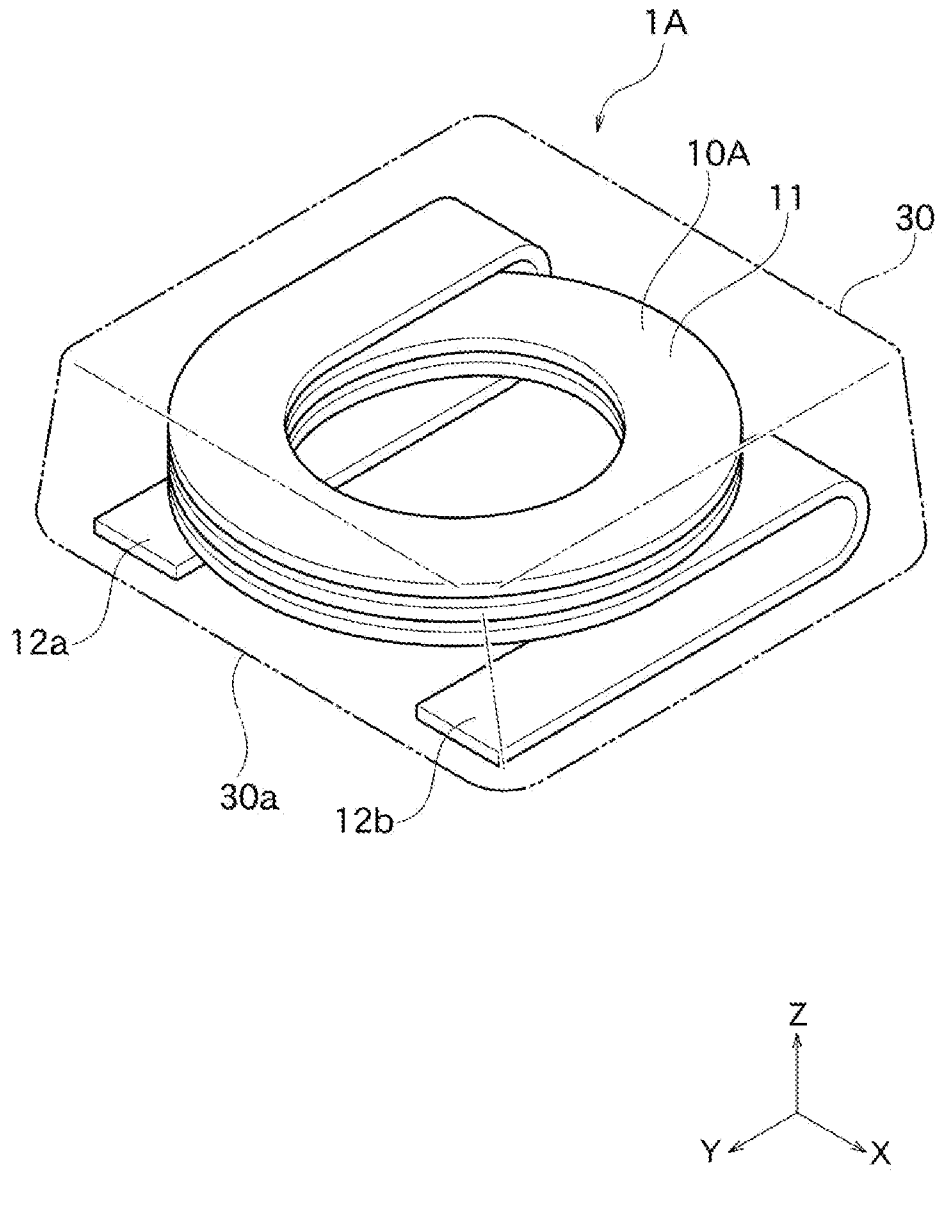
FIG. 11 is a perspective diagram of an example of a coil component according to the second embodiment.

As shown in FIG. 11, the coil component 1A has a coil 10A. The coil 10A is different from the coil 10 of the first embodiment (FIG. 1A) since the coil 10A is made of a flat wire. The coil 10A is a coil that a flat wire is wound in edgewise winding, however, the flat wire may be wound in flatwise winding.

Figure 15:
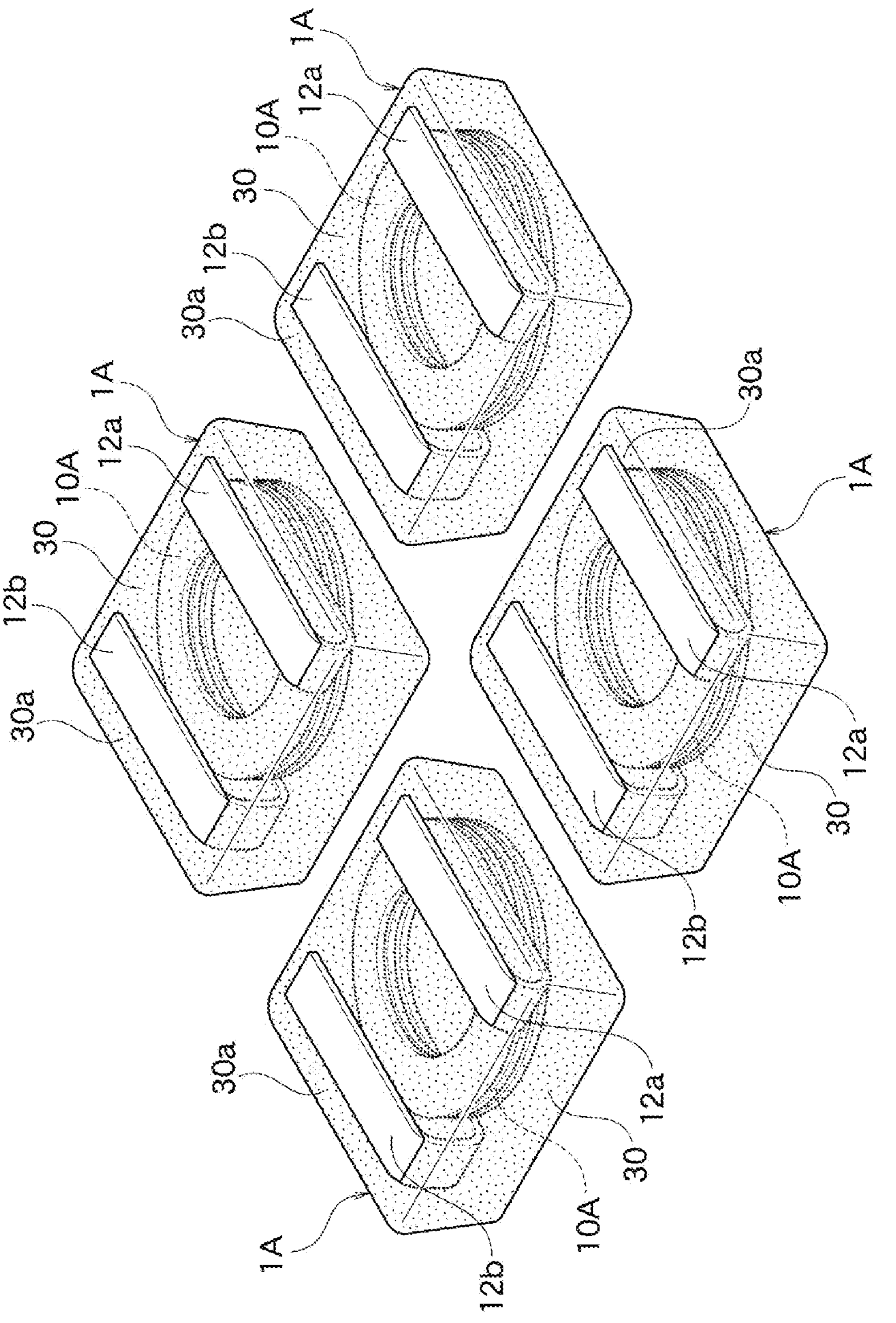
FIG. 15 is a perspective diagram viewing an exterior body shown in FIG. 14 from a mounting plane side.

As shown in FIG. 15, part of a lead part 12*a* of the coil 10A is exposed from a first plane 30*a* of an exterior body 30. Similarly, part of a lead part 12*b* of the coil 10A is exposed from the first plane 30*a* of the exterior body 30. In the present embodiment, the part of the lead part 12*a* exposed form the first plane 30*a* and the part of the lead part 12*b* exposed from the first plane 30*a* function as terminal electrodes. Note that, if necessary, the terminal electrodes 40*a* and 40*b* shown in FIG. 1A may be formed on the first plane 30*a*.

The coil component 1A of the present embodiment is different from the coil component 1 of the first embodiment shown in FIG. 1A, since in the coil component 1A, the core 20 is not provided inside the exterior body 30. When the coil 10A is formed using a flat wire, the position shifting of the coil 10A inside the exterior body 30 can be prevented even without fixing the coil 10A to the core 20. Note that, if necessary, the core 20 is provided to the coil component 1A, and the core 20 may be fixed to the coil 10A.

Figure 12:
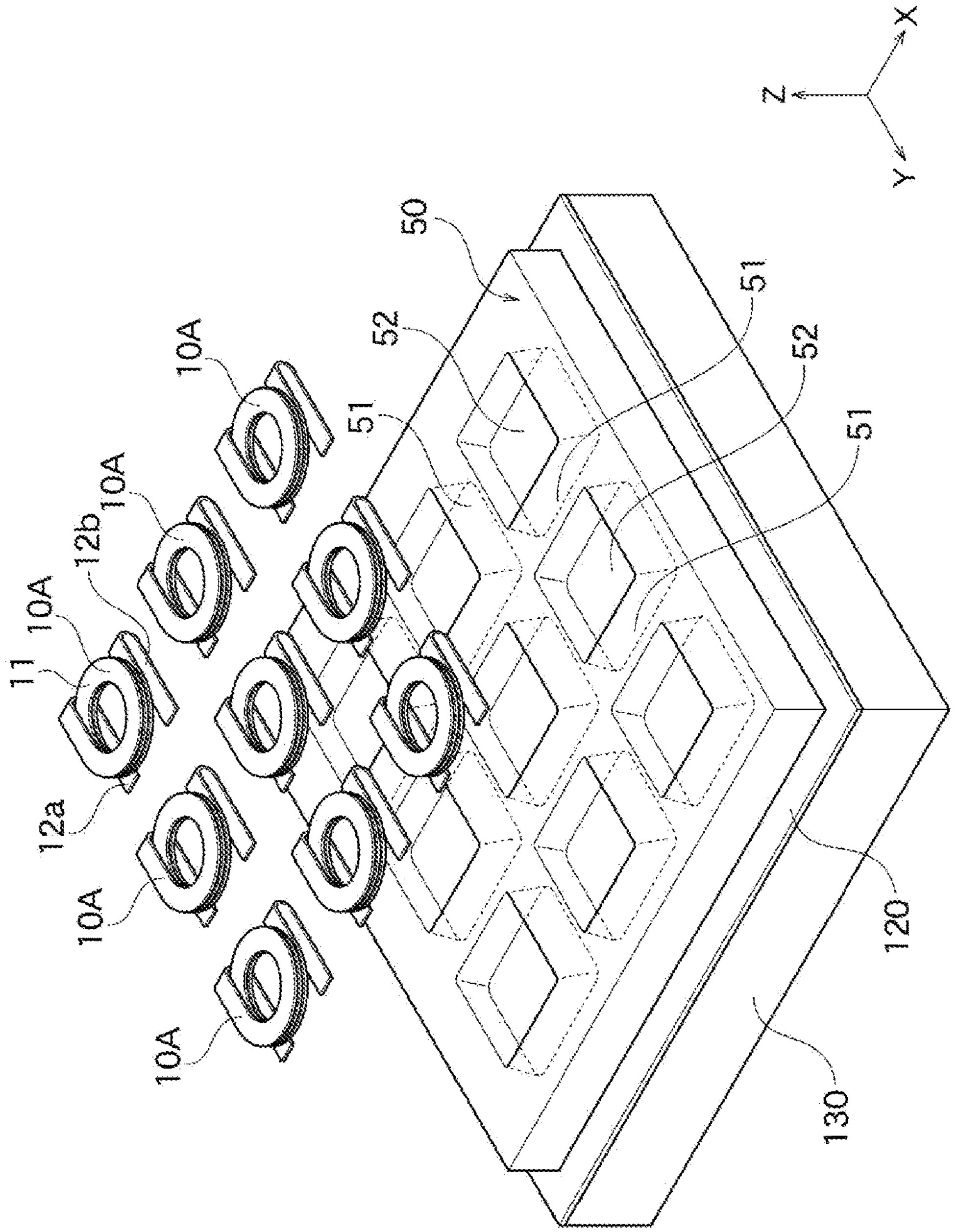
FIG. 12 is a perspective diagram showing an example of a method for producing the coil component shown in FIG. 11.

Next, a method for producing the coil component 1A is described using FIG. 12 to FIG. 15. First, the coils 10A shown in FIG. 12 are prepared. Next, the coils 10A are arranged into the compartments 52 of a compartment frame 50. When the coils 10A are arranged into the compartments 52, the lead parts 12*a* and 12*b* are fixed (adhered) to an adhesive sheet 120 at inside of the compartments 52.

Figure 13:
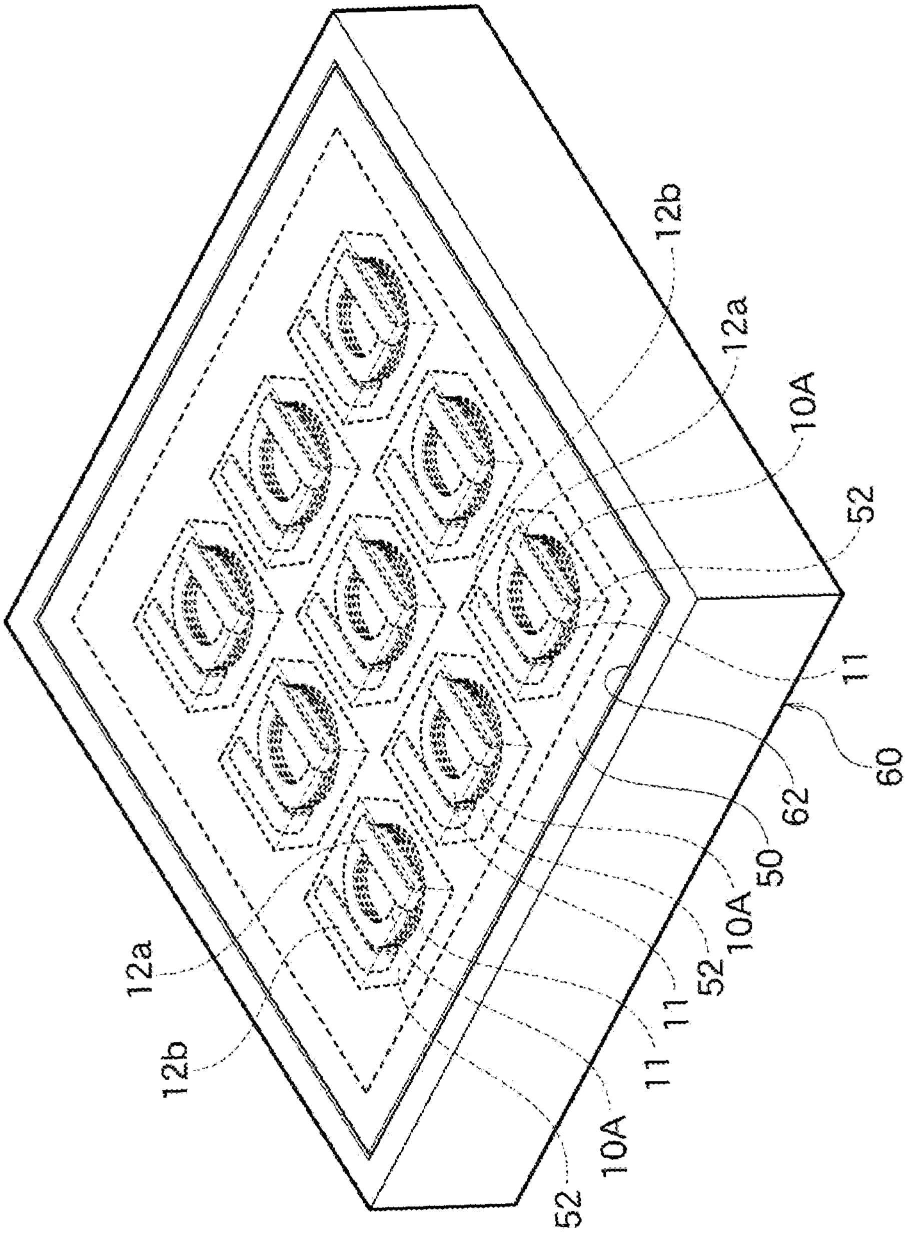
FIG. 13 is a perspective diagram showing an example of a step following the step shown in FIG. 12.
Figure 14:
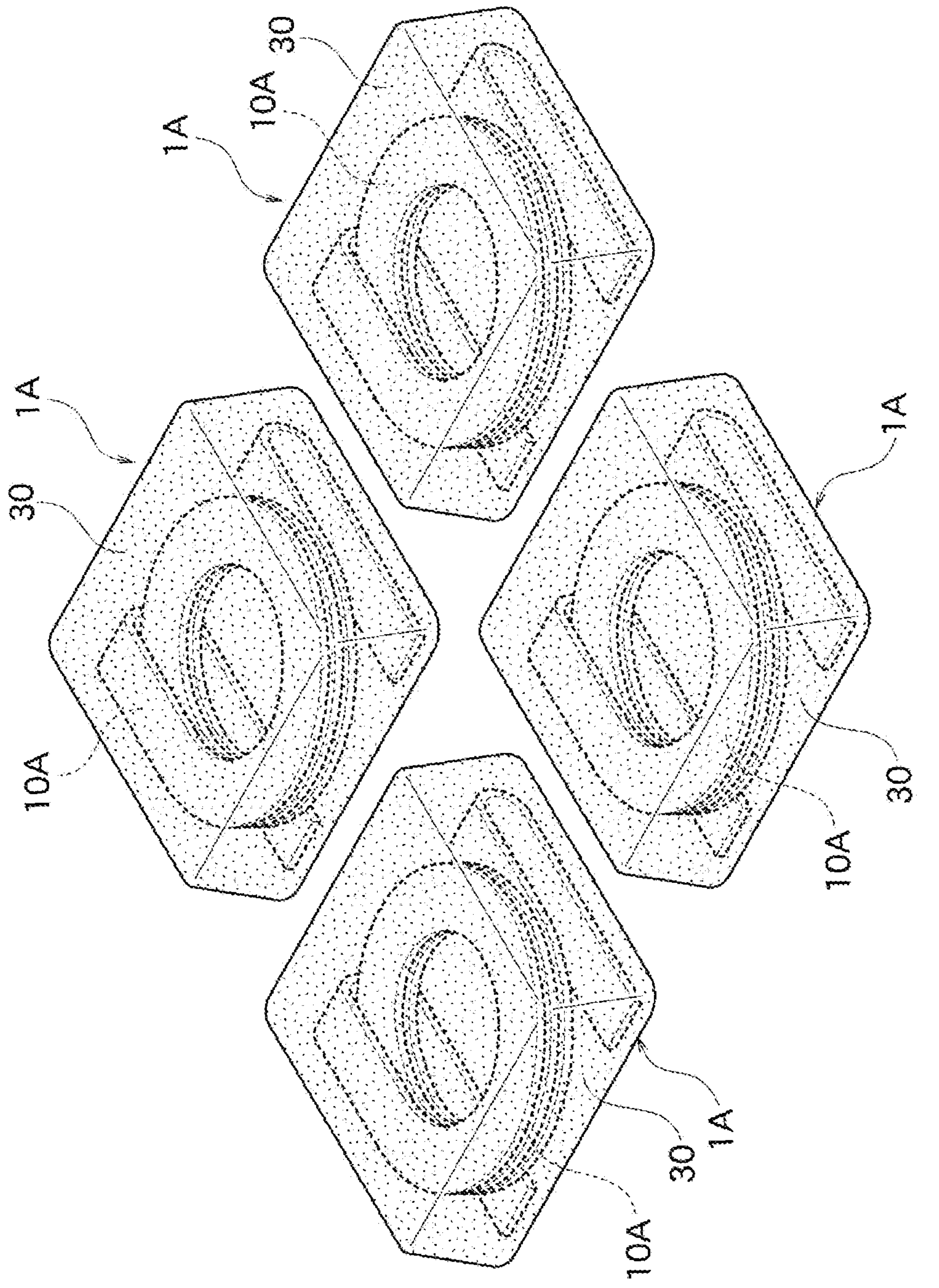
FIG. 14 is a perspective diagram showing an example of a step following the step shown in FIG. 13.

Next, as shown in FIG. 13, while the lead parts 12*a* and 12*b* of the coils 10A are adhered to the adhesive sheet 120, the compartment frame 50 is placed in a mold 60. Thereby, the coils 10A can be accommodated in a cavity 62. The mold 60 is heated before or after accommodating the compartment frame in the cavity 62. Thereby, connection strength between the adhesive sheet 120 and the compartment frame 50 is weakened, and the compartment frame 50 can be released from a pedestal 130 shown in FIG. 12.

As shown in FIG. 13, in the cavity 62, the lead parts 12*a* and 12*b* are facing the side of the opening plane of the cavity 62. The lead parts 12*a* and 12*b* are arranged in a way that these are exposed from the opening plane of the cavity 62. That is, in the present embodiment, the coils 10A are arranged in the compartments 52 in a way that lead parts 12*a* and 12*b* of the coils 10A are exposed from the compartment frame 50. Thereby, the exterior material 80 placed in the cavity 62 moves into the partitioned area 52 so as to cover the wound wire part 11, and also the lead parts 12*a* and 12*b* are exposed from the exterior material 80.

Next, as similar to the first embodiment, the exterior material 80 placed in the cavity 62 is compressed and cured; and molded article 100 is formed which include the exterior bodies 30 formed in the partitioned areas 70, and joining parts 90 formed in the connection areas 72 joining the exterior bodies 30 (see FIG. 8). Next, the exterior bodies 30 are jaggedly disconnected from the joining parts 90, thereby the coil components 1A shown in FIG. 14 and FIG. 15 can be obtained.

The same effects obtained in the first embodiment can be obtained in the present embodiment as well. In addition, in the present embodiment, the terminal electrodes 40*a* and 40*b* (FIG. 1A) can be omitted from the coil component 1A. Thus, configurations and production steps of the coil component 1A can be simplified. Also, since the coil 10A is made by a flat wire, the position shifting of the coil 10A inside the exterior body 30 can be prevented. Also, electric current running through the coil 10A can be increased.

The present disclosure is not limited to the above-mentioned embodiments, and various modifications can be made within the scope of the present disclosure.

Figure 3B:
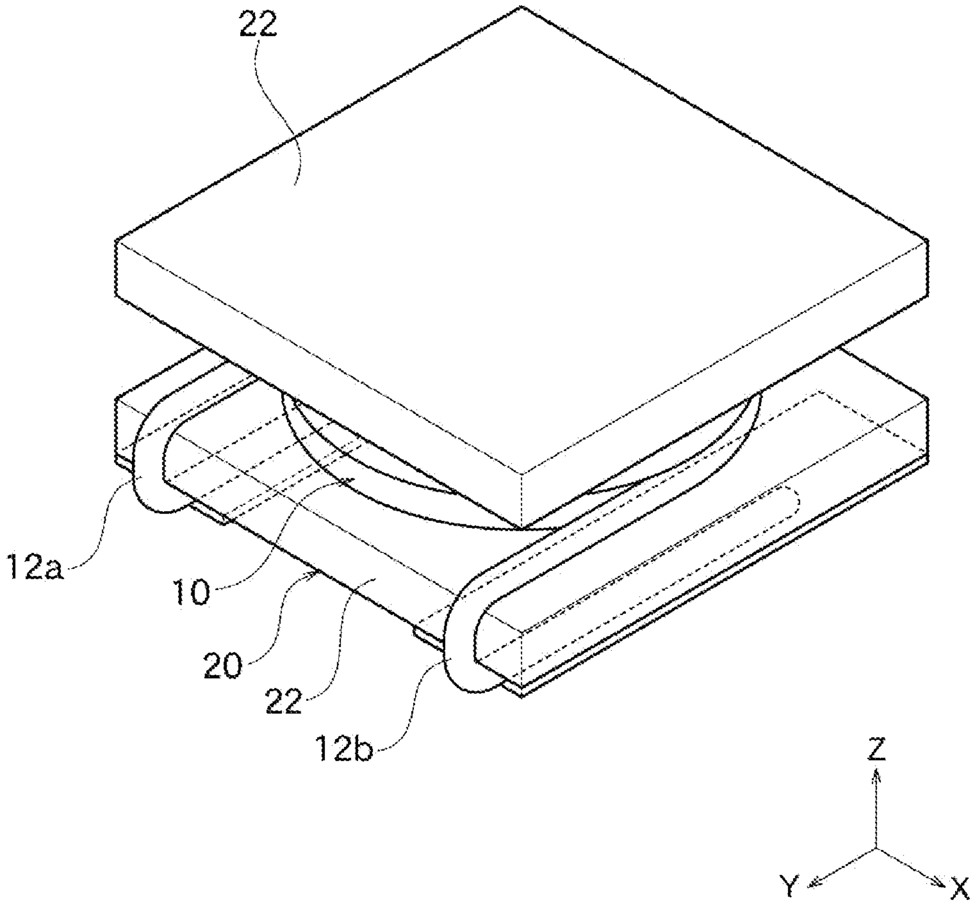
FIG. 3B is a perspective diagram of a modification example of the core shown in FIG. 3A.

Regarding the above-mentioned first embodiment, as shown in FIG. 3B, the core 20 may be a drum core to which the flanges 22 are formed on both ends of the core axis part 21 along the axis direction.

Figure 7B:
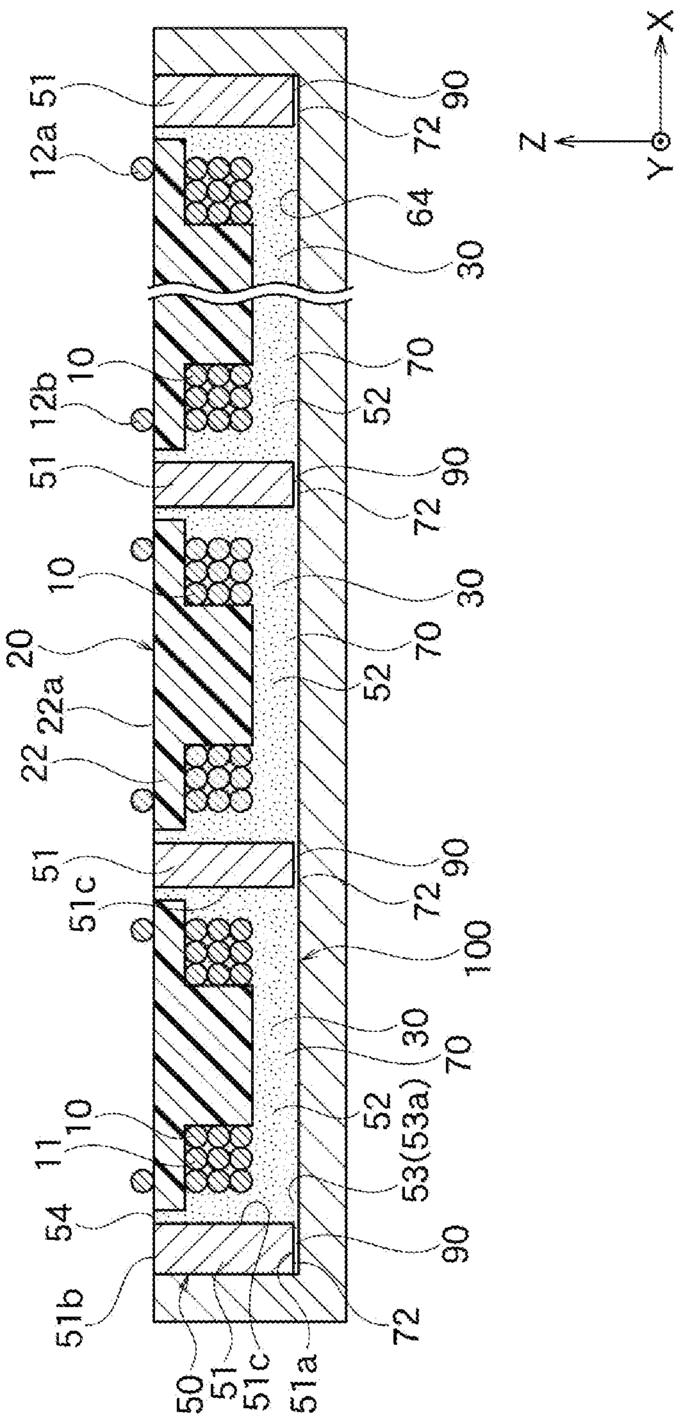
FIG. 7B is a cross-sectional diagram of one example of modification examples of a compartment frame shown in FIG. 7A.

In the above-mentioned first embodiment, as shown in FIG. 7B, the inner wall surface 51*c* of the partition wall 51 does not have to be a slanted surface. That is, the inner wall surface 51*c* may be parallel to Z-axis direction. In this case, the opening areas of the first openings 53 and the opening areas of the second openings 54 are the same.

Figure 7C:
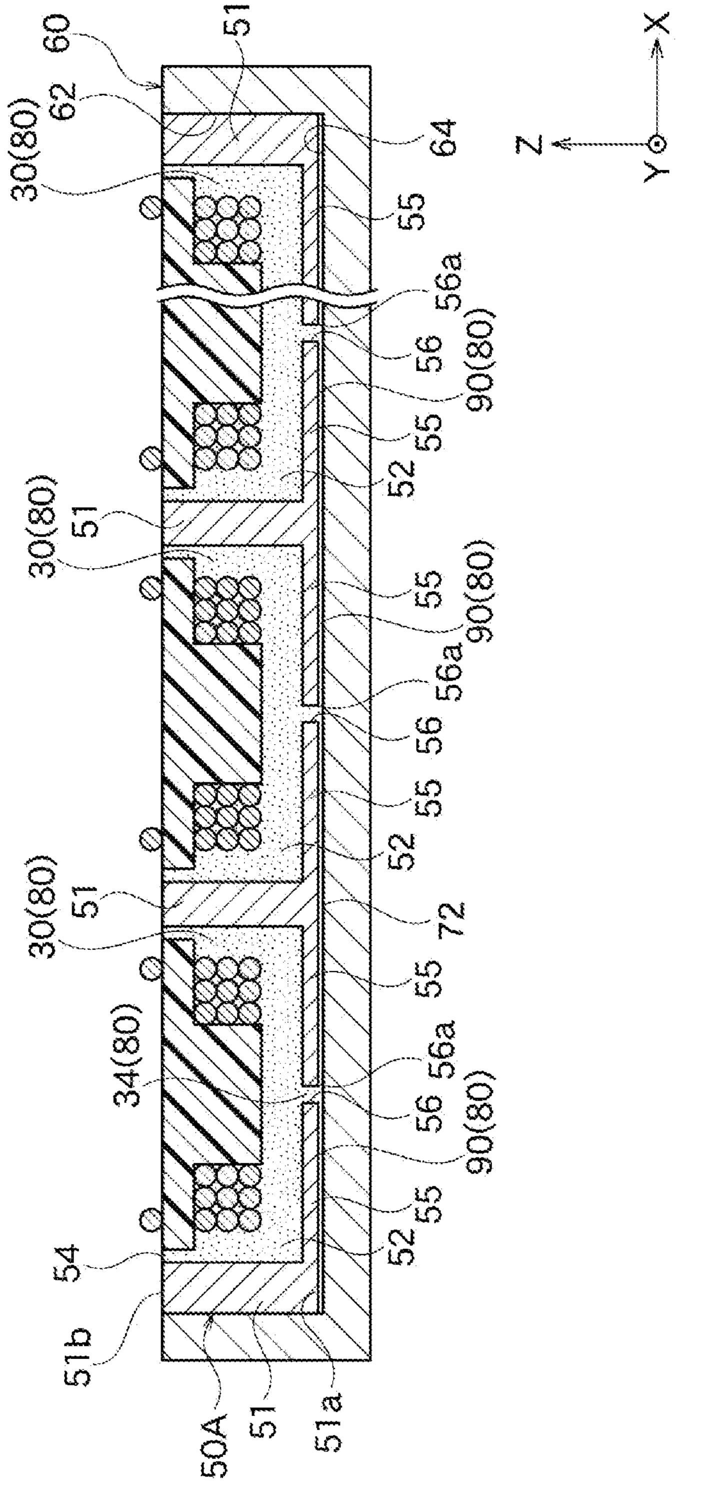
FIG. 7C is a cross-sectional diagram of another example of the modification examples of the compartment frame shown in FIG. 7A.

In the above-mentioned first embodiment, as shown in FIG. 7C, the compartment frame 50 may include the compartments 52 of tubular shape with bottom and surrounded by the partition walls 51, base walls 55 formed on the one side of the compartments 52, and the through holes 56 penetrating through the base walls 55.

The base walls 55 extend in parallel to the base 64 of the cavity 62. The planar shape of the base wall 55 corresponds to the cross-sectional shape perpendicular to the axis direction of the compartment 52, and for example, it may be a quadrilateral shape. The base wall 55 is formed so as to cover one end side of the compartment 52 (the opposite side of the second opening 54). The planar shape of the through hole 56 is, for example, a circular shape. The planar shape of the through hole 56 may be a square shape, a rectangle shape, or any other polygonal shape. The through hole 56 is formed on the center of the base wall 55, however, the position of the base wall 55 may vary.

The connection area 72 is formed between the first end 51*a* of the partition wall 51 and the base 64 of the cavity 62, and also it is formed between the base wall 55 and the bottom 64 of the cavity 62. Therefore, the connection area 72 is formed across substantially the entire area of the bottom 64. The connection area 72 is connected to the compartments 52 through the through holes 56.

By compressing and curing the exterior material 80 placed in the cavity 62 shown in FIG. 7C, the molded article

100 can be formed. The molded article 100 includes the exterior bodies 30 formed in the compartments 52, projections 34 formed on the through holes 56 and connected to the exterior bodies 40, and joining parts 90 joined to the projections 34. That is, the exterior bodies 30 and the joining parts 90 are joined via the projections 34.

For example, by pressing the joining parts 90 against the opening edges 56*a* of the through holes 56, the exterior bodies 30 can be jaggedly disconnected from the joining parts 90. Here, the projections 34 are integrally formed on the exterior bodies 30. Therefore, if necessary, the projections 34 may be removed (jaggedly disconnected). In this case, each of the exterior bodies 30 jaggedly disconnected from the joining parts 90 has trace of the projection 34 (through hole 56). Using this as a marker, the direction of the exterior body 30 can be identified.

Figure 7D:
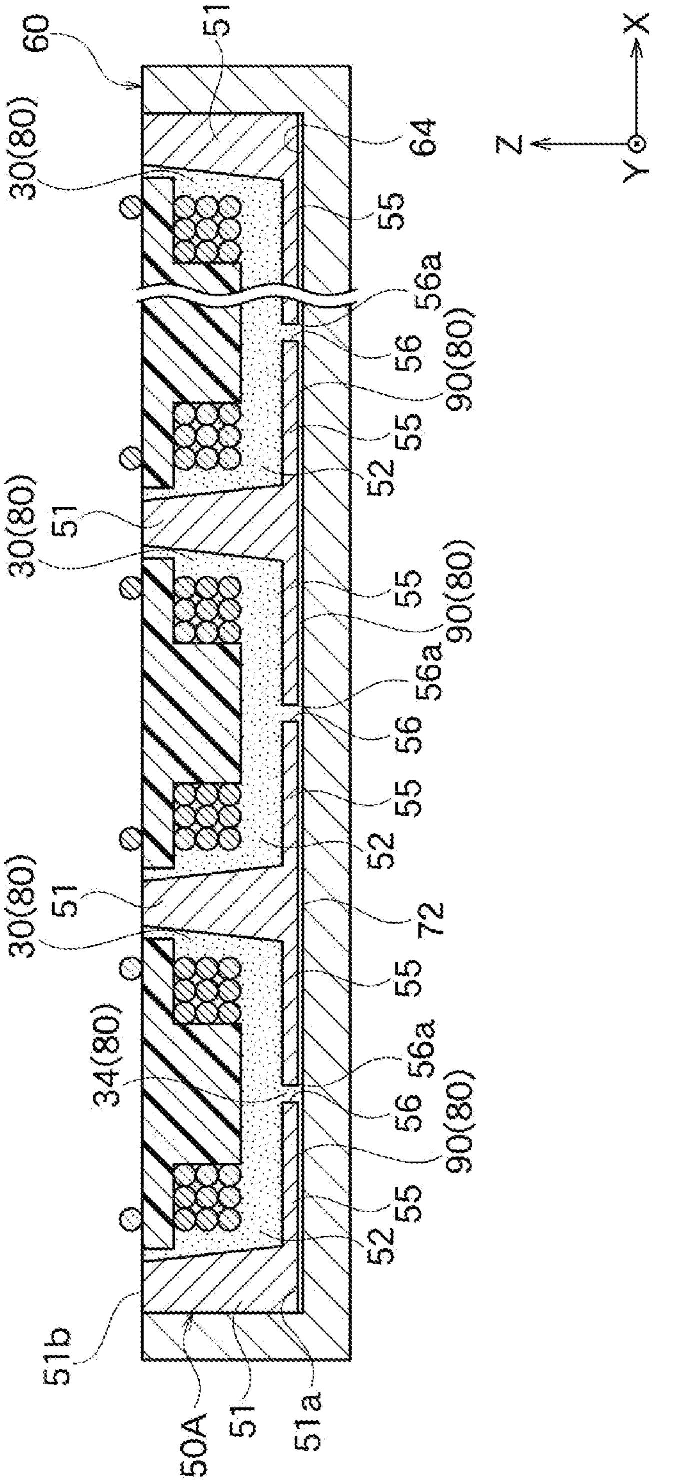
FIG. 7D is a cross-sectional diagram of another modification example of the compartment frame shown in FIG. 7C.

As shown in FIG. 7D, the inner surface wall 51*c* of the partition wall 51 shown in FIG. 7C may be a slanted surface which is angled from the bottom 64 of the mold 60. An inclination angle of the inner surface wall 51*c* with respect to the first end 51*a* of the partition wall 51 (it is the same as the inclination angle of the inner wall surface 51*c* with respect to the bottom 64 of the mold 60) is not particularly limited, and it may be the same as θ5 shown in FIG. 7A; and in the case that the inner wall surface 51*c* is a slanted surface, the inclination angle may be within a range of 60° or larger and less than 90°.

In each of the above-mentioned embodiments, at least one of the first edge 35*a*, the second edge 35*b*, the third edge 35*c*, and the fourth edge 35*d* which are shown in FIG. 1B may be chamfered (it may be cut so that no angled corner is left). In this case, a jagged edge 32 may be formed on at least one of the first edge 35*a*, the second edge 35*b*, the third edge 35*c*, and the fourth edge 35*d* which are chamfered. Also, the interception part formed between the first edge 35*a*, the second edge 35*b*, and the fifth edge 35*e* shown in FIG. 1B may be chamfered, and a jagged edge 32 may be formed on such intersection part. Also, the intersection part between the second edge 35*b*, the third edge 35*c*, and the sixth edge 35*f* may be chamfered, and a jagged edge 32 may be formed on such intersection part. Also, the intersection part between the third edge 35*c*, the fourth edge 35*d*, and the seventh edge 35*g* may be chamfered, and a jagged edge 32 may be formed on such intersection part. Also, the intersection part between the first edge 35*a*, the fourth edge 35*d*, and the eighth edge 35*h* may be chamfered, and a jagged edge 32 may be formed on such intersection part.

In each of the above-mentioned embodiments, the cross-sectional shape of the exterior body 30 shown in FIG. 1A parallel to XZ plane is a truncated shape (a quadrilateral shape), however, it may be any other polygonal shape. For example, the above-mentioned cross-sectional shape may be a hexagonal shape. Also, a cross-sectional shape of the exterior body 30 parallel to YZ plane is a truncated shape (a quadrilateral shape), however, it may be any other polygonal shape. For example, the above-mentioned cross-sectional shape may be a hexagonal shape.

Figure 1C:
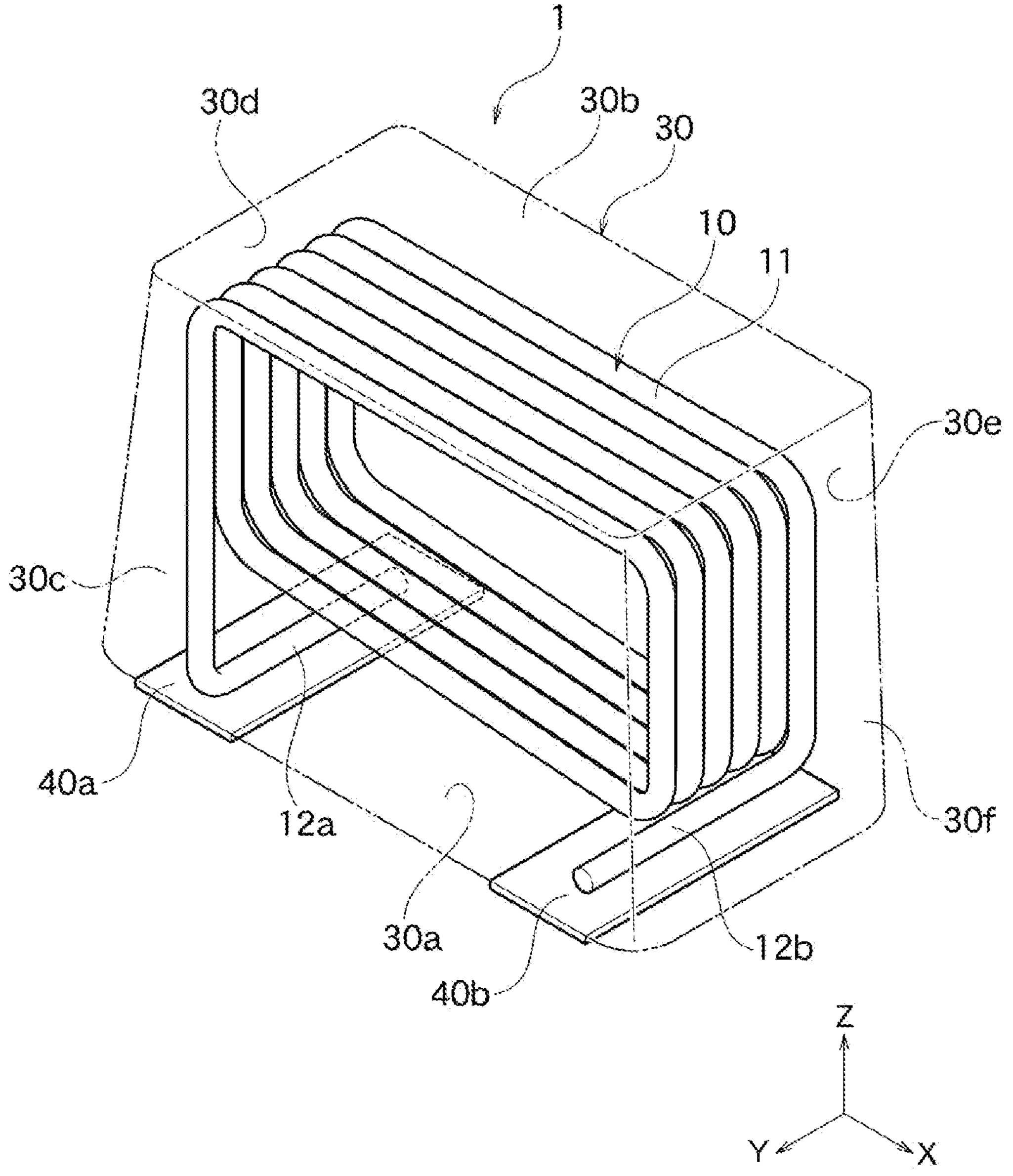
FIG. 1C is a perspective diagram showing one example of modification examples of the coil component of FIG. 1A.

In the above-mentioned first embodiment, as shown in FIG. 1C, the coil 10 may be arranged inside the exterior body 30 in a way that the winding axis direction of the wound wire part 11 is parallel to the first plane 30*a*. In FIG. 1C, the winding axis direction of the wound wire part 11 corresponds to Y-axis direction. The shape of the wound wire part 11 viewed from the winding axis direction is a rectangular shape with a longitudinal side along X-axis direction, however, the shape may be a square shape, any other polygonal shape, a circular shape, or an oval shape. The lead parts 12*a* and 12*b* directly extends from the wound wire part 11 towards the first plane 30*a*, and are arranged on the surface of the first plane 30*a*. Part of the lead part 12*a* may be embedded in the exterior body 30, and part of the lead part 12*b* may be embedded in the exterior body 30.

The cross-sectional shape of the exterior body 30 parallel to XY plane is a rectangular shape, however, it may be a square shape, any other polygonal shape, a circular shape, or an oval shape. The coil component 1 shown in FIG. 1C does not have the core 20 (FIG. 1A). Thus, it is possible to simplify the configuration of the coil component 1; and also, during the production of the coil component 1, the step of providing the coils 10 to the cores 20 (step shown in FIG. 4) can be omitted. However, during the production of the coil component 1, from the point of preventing the position shifting of the coil 10, the core 20 may be provided to the coil component 1 (a flat core which does not have the core axis part 21 shown in FIG. 1A).

Figure 1D:
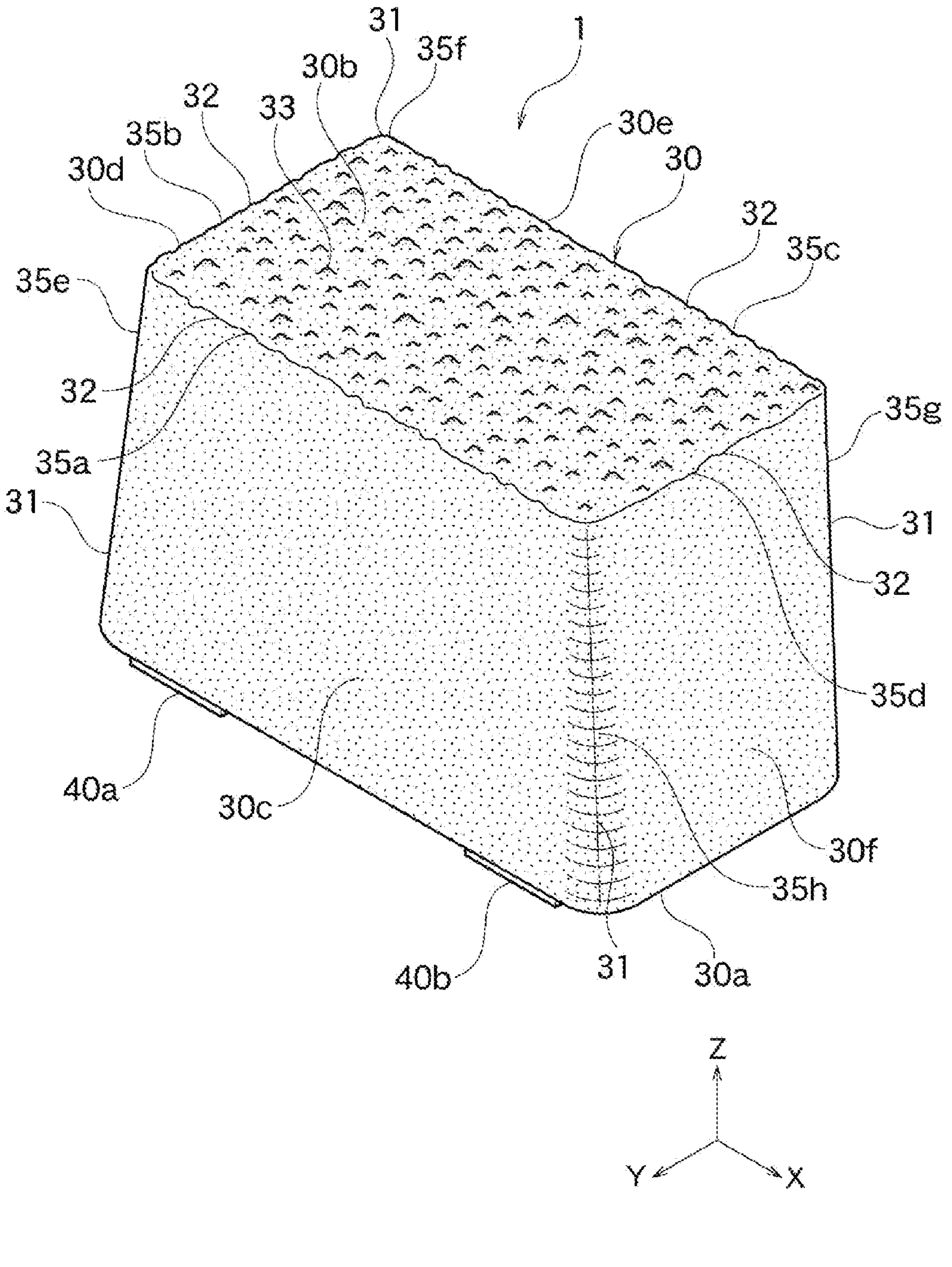
FIG. 1D is a perspective diagram showing one example of modification examples of a coil component schematically showing a surface shape of an external body.

Also, in the case of the modification example shown in FIG. 1D, jagged edges are formed on each of the first edge 35*a*, the second edge 35*b*, the third edge 35*c*, and the fourth edge 35*d* of the exterior body 30. Therefore, also in the case of the modification example, the freshly exposed surfaces of the magnetic particles are not formed on the jagged edge. Hence, oxidation of the magnetic particles can be prevented, and rusting of the surface of the exterior body 30 can be suppressed even without the use of an anti-rusting agent. Also, it is possible to suppress deformation of the exterior body caused by rusting, and decline of a soft magnetic property of the coil component 1 can be prevented. Hence, the inductance property of the coil component 1 can be enhanced.

Figure 1E:
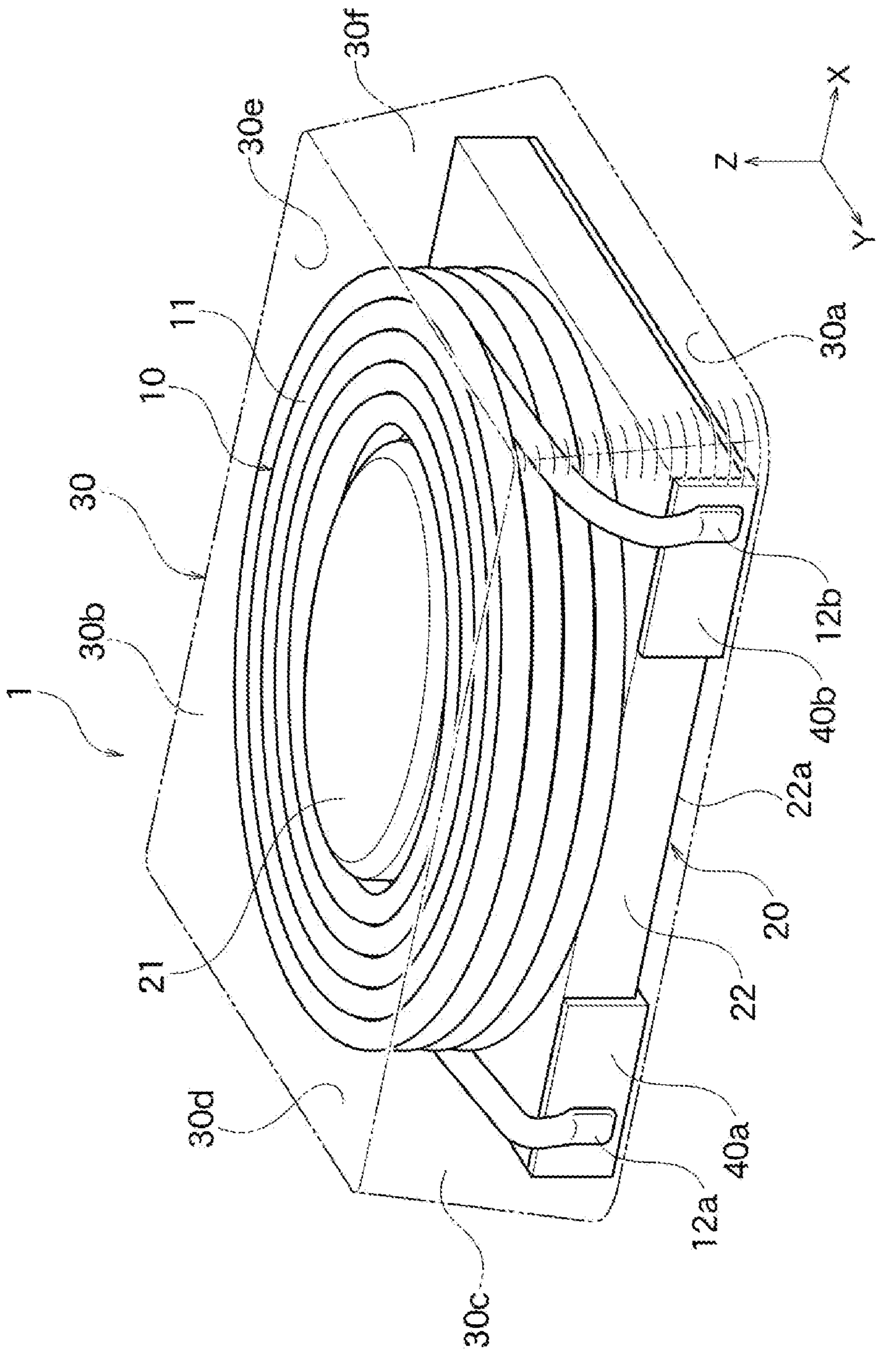
FIG. 1E is a perspective diagram of another example of the modification examples of the coil component shown in FIG. 1A.

In the first embodiment, as shown in FIG. 1E, the terminal electrode 40*a* may extend to the side face of the flange 22 (the side face at Y-axis positive direction in the example shown in FIG. 1E) from the end face 22*a* of the flange 22. Similarly, the terminal electrode 40*b* may extend to the side face of the flange 22 (the side face at Y-axis positive direction in the example shown in FIG. 1E) from the end face 22*a* of the flange 22. In this case, the lead parts 12*a* and 12*b* can connect to the terminal electrodes 40*a* and 40*b* at the position of the side face of the flange 22. Thus, it is easy to secure flatness of the base part of the terminal electrodes 40*a* and 40*b* compared to the case shown in FIG. 1A where the lead parts 12*a* and 12*b* are connected to the terminal electrodes 40*a* and 40*b* at the position corresponding to the end face 22*a* of the flange 22. Thus, connection strength of the terminal electrodes 40*a* and 40*b* to the land pattern of the mounting substrate (not shown in the figure) can be enhanced.

As it can be understood from the above description, followings are disclosed in the present specification.

Supplementary Note 1

A coil component, comprising:

an exterior body, a coil positioned inside the exterior body, and terminal electrodes arranged on a surface of the exterior body and connected to lead parts of the coil; wherein the exterior body is a columnar shape or a polyhedron shape and includes a first plane for arranging the terminal electrodes, a second plane opposing the first plane, and one or more connecting planes connecting the first plane and the second plane; and the exterior body has a jagged edge on at least part of an edge positioned between the second plane and the one or more connecting planes.

Supplementary Note 2

The coil component according to Supplementary note 1, wherein the exterior body is a hexahedron shape including a third plane, a fourth plane, a fifth plane, and a sixth plane each of these connecting to the first plane and the second plane;

the edge includes a first edge positioned between the second plane and the third plane, a second edge positioned between the second plane and the fourth plane, a third edge positioned between the second plane and the fifth plane, and a fourth edge positioned between the second plane and the sixth plane; and the jagged edge is formed on at least one of the first to fourth edges.

Supplementary Note 3

The coil component according to Supplementary note 1 or 2, wherein at least one of the third plane, the fourth plane, the fifth plane, and the sixth plane is slanted.

Supplementary Note 4

The coil component according to Supplementary note 3, wherein the third plane is adjacent to the sixth plane, the fourth plane is adjacent to the third plane, the fifth plane is adjacent to the fourth plane, and the sixth plane is adjacent to the fifth plane; and both of the third plane and the fifth plane are slanted, and/or both of the fourth plane and the sixth plane are slanted.

Supplementary Note 5

The coil component according to any one of Supplementary notes 2 to 4, wherein the exterior body has a curved part formed on at least one of a fifth edge, a sixth edge, a seventh edge, and an eighth edge;

the fifth edge is positioned between the third plane and the fourth plane, the sixth edge is positioned between the fourth plane and the fifth plane, the seventh edge is positioned between the fifth plane and the sixth plane, and the eighth edge is positioned between the sixth plane and the third plane;

the curved part is curved in a cross-section in a direction perpendicular to the first plane; and a radius of curvature of the curved part becomes larger towards one side of the direction perpendicular to the first plane.

Supplementary Note 6

The coil component according to any one of Supplementary notes 1 to 5, wherein the second plane has an emboss-like pattern.

Supplementary Note 7

A method for producing a coil component, comprising:

preparing coils;

arranging the coils in partitioned areas defined by a compartment frame to accommodate the coils in a cavity of a mold;

filling the partitioned areas with an exterior material including magnetic particles and a resin and also filling at least part of connection areas connecting the partitioned areas next to each other with the exterior material;

forming a molded article comprising exterior bodies made from the exterior material filled in partitioned areas and joining parts made from the exterior material filled in the connection areas to join the exterior bodies via the joining parts; and taking the exterior bodies out from the partitioned areas while jaggedly disconnecting the exterior bodies from the joining parts.

Supplementary Note 8

The method for producing the coil component according to Supplementary note 7, wherein jaggedly disconnecting the exterior bodies from the joining parts forms jagged edges at positions where the exterior bodies are disconnected from the joining parts.

Supplementary Note 9

The method for producing the coil component according to Supplementary note 7 or 8, wherein the connection areas includes a space formed between the compartment frame and a bottom of the cavity opposing the compartment frame.

Supplementary Note 10

The method for producing the coil component according to any one of Supplementary notes 7 to 9, wherein the compartment frame comprises compartments of bottomless and tubular shaped which are surrounded by partition walls, and first openings formed on one end of the compartments and opened at a side facing a bottom of the cavity; and taking the exterior bodies out from the partitioned areas is performed by pressing the joining parts against opening edges of the first openings to jaggedly disconnect the exterior bodies from the joining parts.

Supplementary Note 11

The method for producing the coil component according to Supplementary note 10, wherein the partition walls have first ends close to the bottom of the cavity and second ends at the opposite side of the first ends; and jaggedly disconnecting the exterior bodies from the joining parts is performed by pressing the joining parts in a direction from the second ends towards the first ends to take the exterior bodies out from the partitioned areas.

Supplementary Note 12

The method for producing the coil component according to Supplementary note 10 or 11, wherein a cross-sectional area perpendicular to an axis direction of each of the compartments becomes larger further away from the bottom of the cavity.

Supplementary Note 13

The method for producing the coil component according to any one of Supplementary notes 10 to 12, wherein a distance in a direction perpendicular to an axis direction of the compartments between inner wall surfaces facing each other of the partitioned walls becomes larger further away from the bottom of the cavity.

Supplementary Note 14

The method for producing the coil component according to any one of Supplementary notes 10 to 13, wherein the compartment frame comprises second openings opened at a side opposite to the first openings;

opening areas of the second openings are about the same or larger than the opening areas of the first openings; and taking the exterior bodies out from the partitioned areas is performed by taking the exterior bodies out of the partitioned areas through the second openings.

Supplementary Note 15

The method for producing the coil component according to any one of Supplementary notes 7 to 9, wherein the compartment frame comprises compartments of tubular shape with bottom which are surrounded by partition walls, base walls formed on one end of the compartments, and through holes penetrating the base walls; and jaggedly disconnecting the exterior bodies from the joining parts is performed by pressing the joining parts against opening edges of the through holes to take the exterior bodies out from the partitioned areas.

Supplementary Note 16

The method for producing the coil component according to any one of Supplementary notes 7 to 15, further comprising:

preparing cores comprising core axis parts and flanges formed on one end in an axis direction of the core axis parts;

installing the coils to the core axis parts; and arranging the coils together with the cores in the partitioned areas.

Supplementary Note 17

The method for producing the coil component according to Supplementary note 16, wherein arranging the coils to the partitioned areas together with the cores is performed so that end faces of the flanges are exposed from the compartment frame.

Supplementary Note 18

The method for producing the coil component according to any one of Supplementary notes 7 to 17 further comprising arranging a releasable film on a bottom of the cavity so as to span over the partitioned areas and the connection areas.

REFERENCE SIGNS LIST

1,1A . . . Coil component
10,10A . . . Coil
11 . . . Wire wound part
12*a*,12*b* . . . Lead part
20 . . . Core
21 . . . Core axis part
22 . . . Flange
22*a* . . . End face
30 . . . Exterior body
30*a* to 30*f* . . . First to sixth plane
31 . . . Curved part
32 . . . Jagged edge
33 . . . Emboss-like pattern
34 . . . Projection
35*a* to 35*h* . . . First edge to Eighth edge
40*a*,40*b* . . . Terminal electrode
50 . . . Compartment frame
51 . . . Partition wall
51*a* . . . First end
51*b* . . . Second end
51*c* . . . Inner wall surface
52 . . . Compartment
53 . . . First opening
53*a* . . . Opening edge
54 . . . Second opening
55 . . . Base wall
56 . . . Through hole
56*a* . . . Opening edge
60 . . . Mold
61 . . . Main body
62 . . . Cavity
63 . . . Inner wall
64 . . . Bottom
70 . . . Partitioned area
72 . . . Connection area
80 . . . Exterior material
90 . . . Joining part
100 . . . Molded article
110 . . . Releasable film
120 . . . Adhesive sheet
130 . . . Pedestal

What is claimed is:

1. A coil component, comprising:

an exterior body, a coil positioned inside the exterior body, and terminal electrodes arranged on a surface of the exterior body and connected to lead parts of the coil; wherein the exterior body is a columnar shape or a polyhedron shape and includes a first plane for arranging the terminal electrodes, a second plane opposing the first plane, and one or more connecting planes connecting the first plane and the second plane; and the exterior body has a jagged edge on at least part of an edge positioned between the second plane and the one or more connecting planes.

2. The coil component according to claim 1, wherein the exterior body is a hexahedron shape including a third plane, a fourth plane, a fifth plane, and a sixth plane each of these connecting to the first plane and the second plane;

the edge includes a first edge positioned between the second plane and the third plane, a second edge positioned between the second plane and the fourth plane, a third edge positioned between the second plane and the fifth plane, and a fourth edge positioned between the second plane and the sixth plane; and the jagged edge is formed on at least one of the first to fourth edges.

3. The coil component according to claim 2, wherein
the exterior body has a curved part formed on at least one of a fifth edge, a sixth edge, a seventh edge, and an eighth edge;
the fifth edge is positioned between the third plane and the fourth plane, the sixth edge is positioned between the fourth plane and the fifth plane, the seventh edge is positioned between the fifth plane and the sixth plane, and the eighth edge is positioned between the sixth plane and the third plane;
the curved part is curved in a cross-section in a direction perpendicular to the first plane; and
a radius of curvature of the curved part becomes larger towards one side of the direction perpendicular to the first plane.

4. The coil component according to claim 2, wherein at least one of the third plane, the fourth plane, the fifth plane, and the sixth plane is slanted.

5. The coil component according to claim 4, wherein
the third plane is adjacent to the sixth plane, the fourth plane is adjacent to the third plane, the fifth plane is adjacent to the fourth plane, and the sixth plane is adjacent to the fifth plane; and
both of the third plane and the fifth plane are slanted, and/or both of the fourth plane and the sixth plane are slanted.

6. The coil component according to claim 1, wherein the second plane has an emboss-like pattern.

7. A method for producing a coil component, comprising:
preparing coils;
arranging the coils in partitioned areas defined by a compartment frame to accommodate the coils in a cavity of a mold;
filling the partitioned areas with an exterior material including magnetic particles and a resin and also filling at least part of connection areas connecting the partitioned areas next to each other with the exterior material;
forming a molded article comprising exterior bodies made from the exterior material filled in partitioned areas and joining parts made from the exterior material filled in the connection areas to join the exterior bodies via the joining parts; and
taking the exterior bodies out from the partitioned areas while jaggedly disconnecting the exterior bodies from the joining parts.

8. The method for producing the coil component according to claim 7, wherein jaggedly disconnecting the exterior bodies from the joining parts forms jagged edges at positions where the exterior bodies are disconnected from the joining parts.

9. The method for producing the coil component according to claim 7, wherein the connection areas comprise a space formed between the compartment frame and a bottom of the cavity opposing the compartment frame.

10. The method for producing the coil component according to claim 7, wherein
the compartment frame comprises compartments of bottomless and tubular shaped which are surrounded by partition walls, and first openings formed on one end of the compartments and opened at a side facing a bottom of the cavity; and
taking the exterior bodies out from the partitioned areas is performed by pressing the joining parts against opening edges of the first openings to jaggedly disconnect the exterior bodies from the joining parts.

11. The method for producing the coil component according to claim 10, wherein
the partition walls have first ends close to the bottom of the cavity and second ends at the opposite side of the first ends; and
jaggedly disconnecting the exterior bodies from the joining parts is performed by pressing the joining parts in a direction from the second ends towards the first ends to take the exterior bodies out from the partitioned areas.

12. The method for producing the coil component according to claim 10, wherein a cross-sectional area perpendicular to an axis direction of each of the compartments becomes larger further away from the bottom of the cavity.

13. The method for producing the coil component according to claim 10, wherein a distance between inner wall surfaces facing each other of the partitioned walls in a direction perpendicular to an axis direction of the compartments becomes larger further away from the bottom of the cavity.

14. The method for producing the coil component according to claim 10, wherein
the compartment frame comprises second openings opened at a side opposite to the first openings;
opening areas of the second openings are about the same or larger than the opening areas of the first openings; and
taking the exterior bodies out from the partitioned areas is performed by taking the exterior bodies out of the partitioned areas through the second openings.

15. The method for producing the coil component according to claim 7, wherein
the compartment frame comprises compartments of tubular shape with bottom which are surrounded by partition walls, base walls formed on one end of the compartments, and through holes penetrating the base walls; and
jaggedly disconnecting the exterior bodies from the joining parts is performed by pressing the joining parts against opening edges of the through holes to take the exterior bodies out from the partitioned areas.

16. The method for producing the coil component according to claim 7, further comprising:
preparing cores comprising core axis parts and flanges formed on one end in an axis direction of the core axis parts;
installing the coils to the core axis parts; and
arranging the coils together with the cores in the partitioned areas.

17. The method for producing the coil component according to claim 16, wherein arranging the coils to the partitioned areas together with the cores is performed so that end faces of the flanges are exposed from the compartment frame.

18. The method for producing the coil component according to claim 7, further comprising arranging a releasable film on a bottom of the cavity so as to span over the partitioned areas and the connection areas.

* * * * *